United States Patent
Ryu et al.

(10) Patent No.: US 10,091,004 B2
(45) Date of Patent: *Oct. 2, 2018

(54) LARGE-SCALE SIMULTANEOUS DIGITAL SIGNATURE SERVICE SYSTEM BASED ON HASH FUNCTION AND METHOD THEREOF

(71) Applicant: MARKANY INC., Seoul (KR)

(72) Inventors: Ho-il Ryu, Seoul (KR); Ji-sung Choi, Yeoju-si (KR); Dong-uk Lee, Seoul (KR)

(73) Assignee: MARKANY INC., Seoul (KR)

(*) Notice: Subject to any disclaimer, the term of this patent is extended or adjusted under 35 U.S.C. 154(b) by 190 days.

This patent is subject to a terminal disclaimer.

(21) Appl. No.: 15/054,976

(22) Filed: Feb. 26, 2016

(65) Prior Publication Data
US 2017/0141924 A1 May 18, 2017

(30) Foreign Application Priority Data
Nov. 17, 2015 (KR) .................. 10-2015-0160810

(51) Int. Cl.
*H04L 29/06* (2006.01)
*H04L 9/32* (2006.01)

(52) U.S. Cl.
CPC .......... *H04L 9/3247* (2013.01); *H04L 9/3236* (2013.01); *H04L 63/0876* (2013.01)

(58) Field of Classification Search
CPC .. H04L 9/3236; H04L 9/3247; H04L 63/0876
See application file for complete search history.

(56) References Cited

U.S. PATENT DOCUMENTS

| 6,237,096 | B1* | 5/2001 | Bisbee | G06Q 20/00 705/51 |
| 6,301,659 | B1* | 10/2001 | Micali | G06Q 20/02 713/157 |
| 9,614,682 | B2* | 4/2017 | Buldas | H04L 9/3247 |
| 9,697,340 | B2* | 7/2017 | Child | G06F 21/31 |
| 9,705,730 | B1* | 7/2017 | Petri | G06F 3/0619 |
| 9,819,494 | B2* | 11/2017 | Ryu | H04L 9/3247 |
| 9,853,819 | B2* | 12/2017 | Truu | H04L 9/3247 |
| 2002/0184504 | A1* | 12/2002 | Hughes | H04L 9/3236 713/177 |
| 2004/0186996 | A1* | 9/2004 | Gibbs | H04L 63/123 713/168 |
| 2005/0055437 | A1* | 3/2005 | Burckart | G06F 17/30887 709/224 |

(Continued)

FOREIGN PATENT DOCUMENTS

KR 100241349 B1 2/2000

*Primary Examiner* — David Garcia Cervetti
(74) *Attorney, Agent, or Firm* — Lucas & Mercanti, LLP

(57) ABSTRACT

Disclosed are a system and method of a large-scale simultaneous digital signature service based on a hash function. According to the system and method, the main agent that requires the generation of a digital signature does not itself generate the digital signature, and digital signatures may be simultaneously and stably generated for large-scale data such as multiple electronic documents and digital data, using a hash function and a hash tree, which are known as a simple and secure method, to guarantee the integrity of the data in a digital signature-based structure based on multiple servers.

13 Claims, 10 Drawing Sheets

(56) References Cited

U.S. PATENT DOCUMENTS

| | | | | |
|---|---|---|---|---|
| 2005/0114666 | A1* | 5/2005 | Sudia | H04L 9/3236 713/175 |
| 2006/0095763 | A1* | 5/2006 | Iyengar | H04L 9/3236 713/167 |
| 2006/0149671 | A1* | 7/2006 | Nix | G06Q 20/04 705/40 |
| 2008/0256362 | A1* | 10/2008 | Takenaka | G06F 21/6254 713/180 |
| 2008/0263177 | A1* | 10/2008 | Breiter | H04L 29/06 709/217 |
| 2009/0006853 | A1* | 1/2009 | Li | H04L 63/0428 713/176 |
| 2009/0157735 | A1* | 6/2009 | Gentry | G06Q 20/02 |
| 2009/0164793 | A1* | 6/2009 | Yoshioka | H04N 7/1675 713/180 |
| 2010/0005310 | A1* | 1/2010 | Gentry | H04L 9/3242 713/176 |
| 2010/0076930 | A1* | 3/2010 | Vosshall | G06F 17/30575 707/638 |
| 2010/0110935 | A1* | 5/2010 | Tamassia | H04L 63/12 370/256 |
| 2011/0080618 | A1* | 4/2011 | Viswanathan | G06F 21/64 358/3.28 |
| 2011/0137916 | A1* | 6/2011 | Deen | G06F 17/3002 707/747 |
| 2011/0208828 | A1* | 8/2011 | Sakakihara | G06F 17/30545 709/217 |
| 2011/0302419 | A1* | 12/2011 | Yoshioka | H04L 9/3236 713/179 |
| 2012/0203745 | A1* | 8/2012 | Myers | G06F 17/3033 707/691 |
| 2012/0209822 | A1* | 8/2012 | Prabhakar | G06F 17/30371 707/703 |
| 2012/0303963 | A1* | 11/2012 | Murao | G06F 21/64 713/178 |
| 2012/0324229 | A1* | 12/2012 | Buldas | H04L 9/321 713/176 |
| 2013/0198838 | A1* | 8/2013 | Schmidt | H04L 9/3234 726/22 |
| 2013/0238752 | A1* | 9/2013 | Park | H04L 67/1097 709/217 |
| 2013/0276058 | A1* | 10/2013 | Buldas | G06F 21/64 726/2 |
| 2014/0245020 | A1* | 8/2014 | Buldas | G06F 21/64 713/177 |
| 2014/0298010 | A1* | 10/2014 | Ryan | G06F 21/33 713/158 |
| 2015/0039893 | A1* | 2/2015 | Buldas | H04L 9/3247 713/176 |
| 2015/0052615 | A1* | 2/2015 | Gault | G06F 21/60 726/26 |
| 2015/0156026 | A1* | 6/2015 | Gault | H04L 9/3297 713/178 |
| 2015/0222619 | A1* | 8/2015 | Hughes | H04L 63/08 713/168 |
| 2015/0295720 | A1* | 10/2015 | Buldas | H04L 9/3247 713/176 |
| 2016/0012424 | A1* | 1/2016 | Simon | G06Q 20/3674 705/67 |
| 2016/0028721 | A1* | 1/2016 | Buldas | G06F 21/64 713/175 |
| 2016/0098723 | A1* | 4/2016 | Feeney | G06Q 20/4016 705/75 |
| 2016/0098730 | A1* | 4/2016 | Feeney | G06Q 30/0185 705/71 |
| 2016/0110261 | A1* | 4/2016 | Parab | G06F 11/1453 707/692 |
| 2016/0119152 | A1* | 4/2016 | Gault | H04L 9/3297 713/178 |
| 2016/0125675 | A1* | 5/2016 | Ziller | B60R 25/24 340/5.72 |
| 2016/0204942 | A1* | 7/2016 | Bohli | G06F 21/64 713/168 |
| 2016/0249176 | A1* | 8/2016 | Pearce | H04W 4/029 |
| 2016/0253523 | A1* | 9/2016 | Kroonmaa | G06F 21/30 726/26 |
| 2016/0306373 | A1* | 10/2016 | Mashima | G05B 15/02 |
| 2016/0344550 | A1* | 11/2016 | Anton | H04L 9/3236 |
| 2016/0344737 | A1* | 11/2016 | Anton | G06F 21/6227 |
| 2016/0364555 | A1* | 12/2016 | Child | G06F 21/31 |
| 2017/0033932 | A1* | 2/2017 | Truu | H04L 9/3247 |
| 2017/0041148 | A1* | 2/2017 | Pearce | H04L 9/3247 |
| 2017/0054736 | A1* | 2/2017 | Krishnamurthy | H04L 63/123 |
| 2017/0070350 | A1* | 3/2017 | Ryu | H04L 9/3247 |
| 2017/0078101 | A1* | 3/2017 | Maximov | H04L 9/006 |
| 2017/0083867 | A1* | 3/2017 | Saxena | G06Q 10/103 |
| 2017/0093579 | A1* | 3/2017 | Maximov | H04L 9/006 |
| 2017/0104598 | A1* | 4/2017 | Maximov | H04L 9/006 |
| 2017/0126410 | A1* | 5/2017 | Maximov | H04L 9/006 |
| 2017/0126702 | A1* | 5/2017 | Krishnamurthy | H04L 63/123 |
| 2017/0187532 | A1* | 6/2017 | Maximov | H04L 9/006 |
| 2017/0249218 | A1* | 8/2017 | Falkinder | G06F 17/30194 |

* cited by examiner

FIG. 5

|     | $X_0$ | $X_1$ | $X_2$ | $X_3$ | $X_4$ | $X_5$ | $X_6$ | $X_7$ | $X_8$ | $X_9$ | $X_{10}$ | $X_{11}$ | $X_{12}$ | $X_{13}$ | $X_{14}$ | $X_{15}$ |
|---|---|---|---|---|---|---|---|---|---|---|---|---|---|---|---|---|
| $X_0$  | 0 | 1 | 0 | 1 | 0 | 0 | 0 | 1 | 0 | 0 | 0 | 0 | 0 | 0 | 0 | 1 |
| $X_1$  | 1 | 0 | 1 | 0 | 0 | 0 | 1 | 0 | 0 | 0 | 0 | 0 | 0 | 0 | 1 | 0 |
| $X_2$  | 0 | 1 | 0 | 1 | 0 | 1 | 0 | 0 | 0 | 0 | 0 | 0 | 0 | 1 | 0 | 0 |
| $X_3$  | 1 | 0 | 1 | 0 | 1 | 0 | 0 | 0 | 0 | 0 | 0 | 0 | 1 | 0 | 0 | 0 |
| $X_4$  | 0 | 0 | 0 | 1 | 0 | 1 | 0 | 1 | 0 | 0 | 0 | 1 | 0 | 0 | 0 | 0 |
| $X_5$  | 0 | 0 | 1 | 0 | 1 | 0 | 1 | 0 | 0 | 0 | 1 | 0 | 0 | 0 | 0 | 0 |
| $X_6$  | 0 | 1 | 0 | 0 | 0 | 1 | 0 | 1 | 0 | 1 | 0 | 0 | 0 | 0 | 0 | 0 |
| $X_7$  | 1 | 0 | 0 | 0 | 1 | 0 | 1 | 0 | 1 | 0 | 0 | 0 | 0 | 0 | 0 | 0 |
| $X_8$  | 0 | 0 | 0 | 0 | 0 | 0 | 0 | 1 | 0 | 1 | 0 | 1 | 0 | 0 | 0 | 1 |
| $X_9$  | 0 | 0 | 0 | 0 | 0 | 0 | 1 | 0 | 1 | 0 | 1 | 0 | 0 | 0 | 1 | 0 |
| $X_{10}$ | 0 | 0 | 0 | 0 | 0 | 1 | 0 | 0 | 0 | 1 | 0 | 1 | 0 | 1 | 0 | 0 |
| $X_{11}$ | 0 | 0 | 0 | 0 | 1 | 0 | 0 | 0 | 1 | 0 | 1 | 0 | 1 | 0 | 0 | 0 |
| $X_{12}$ | 0 | 0 | 0 | 1 | 0 | 0 | 0 | 0 | 0 | 0 | 0 | 1 | 0 | 1 | 0 | 1 |
| $X_{13}$ | 0 | 0 | 1 | 0 | 0 | 0 | 0 | 0 | 0 | 0 | 1 | 0 | 1 | 0 | 1 | 0 |
| $X_{14}$ | 0 | 1 | 0 | 0 | 0 | 0 | 0 | 0 | 0 | 1 | 0 | 0 | 0 | 1 | 0 | 1 |
| $X_{15}$ | 1 | 0 | 0 | 0 | 0 | 0 | 0 | 0 | 1 | 0 | 0 | 0 | 1 | 0 | 1 | 0 |

LARGE-SCALE SIMULTANEOUS DIGITAL SIGNATURE SERVICE SYSTEM BASED ON HASH FUNCTION AND METHOD THEREOF

CROSS REFERENCE TO RELATED APPLICATION

This application claims the benefit of Korean Patent Application No. 10-2015-0160810, filed Nov. 17, 2015, the content of which is incorporated herein by reference.

BACKGROUND OF THE INVENTION

Field of the Invention

The present invention generally relates to a large-scale simultaneous digital signature service system based on a hash function and a method thereof that may stably perform large-scale simultaneous digital signature for large-scale digital data using multiple servers in a digital signature service based on a hash function.

Description of the Related Art

Generally, an electronic document, such as a Hangul document, a Word document, a PDF document, or the like, is a document that is written using a computer and is made up of digital information. Unlike conventional documents made of paper, electronic documents may be transmitted in a short time over a data communication network, the Internet, or the like. Accordingly, with the development in communications technology using computers, the use of electronic documents is rapidly increasing.

However, because the electronic document is transmitted in the form of digital signals over a communication network, the security thereof may be weak. Therefore, as one method for improving the reliability of electronic documents, a digital signature may be attached to the document.

Such a digital signature means a seal, a signature, or a cryptographic signature, which is made up of digital information for verifying the identity of the sender of the electronic document, digital data, or digital message. This may be used to guarantee that the content of the delivered electronic document or digital data has not changed. Therefore, a user attaches a digital signature made up of digital information to an electronic document or digital data rather than directly placing a seal or writing a signature on the document.

Meanwhile, the digital signature may be used for certification of an electronic document or digital data in electronic transactions in which online contracts, electronic seals, etc. are required. Also, recently, the digital signature is actively used as a means for guaranteeing the reliability of electronic transactions, as it is legally recognized.

Also, digital signatures are made by signatories on electronic documents or in services such as electronic contracts over the web, electronic subscriptions, and the like. In this case, authentication certificates for certifying the digital signature may be used. The authentication certificate is a certificate that is issued by an institution authorized by a country, and confirms the identity of the signatory or verifies the digital signature of the signatory.

Additional advantages acquired from the use of digital signatures are that the digital signature may be easily transmitted, cannot be repudiated, cannot be copied by others, and automatically maintains a time stamp. Because the digital signature may be used for any electronic document or digital data, regardless of whether it is encrypted or not, the recipient is guaranteed that the electronic document or the digital data has arrived without falsification and may verify the identity of the sender.

Meanwhile, in a conventional digital signature method, a user stores a digital signature in a predetermined computer in advance and attaches the stored digital signature to an electronic document when needed. In this case, the seal or signature of the user, which was converted into digital information through a scanning process, may be used as the digital signature.

However, in the case of the conventional digital signature method, because it is necessary to scan the seal or signature of a user in order to store it in a computer, the process for registering the digital signature is complicated, and because the digital signature is provided through a specific type of network, not all users are allowed to register digital signature. Also, because the recipient of the electronic document cannot verify the authenticity of the signature attached to the document, there is a disadvantage in that the document has low reliability.

Furthermore, these days, as computer crime techniques become more sophisticated, if electronic documents and/or digital signatures are falsified or forged during the process of transmitting the electronic documents, this cannot be detected. Accordingly, the digital signature may not achieve its original object.

In order to solve the above problem, a digital signature method using a public key-based system, which is designed based on public key encryption, has been used recently. Currently, with the development in information and communication technology and the proliferation of high-speed Internet access, demand for information security is increasing in various fields of society. Therefore, domestic and foreign governments and companies are promoting the distribution of documents that are digitally signed using passwords and digital signatures that use a public key-based system.

This digital signature method using the public key-based system electronically writes a certain document, and creates a hashed message from the document using specific software. Then, the hash is encrypted using a private key, which has been received in advance from a public-private key generation center. Here, the encrypted hash becomes the digital signature for the message.

However, the conventional digital signature method using the public key-based system requires a large amount of arithmetic computational resources in order to support digital signatures based on public keys. Therefore, it is unsuitable for simultaneously generating digital signatures for a large amount of data in an Internet of Things (IoT) environment.

Meanwhile, a digital signature system based on a hash function is technology capable of generating a digital signature for each object in an IoT environment. According to this system, rather than performing the digital signature using the limited arithmetic computational resources of the object, data required for generating a signature are centralized in a server, specialized for performing digital signatures, to be processed all together.

In this case, because the reliability of the digital signature is based on the reliability of an authentication value, a plurality of digital signature systems generate identical authentication values by interworking with each other, so as to raise the reliability of the authentication value and signatures.

Also, the way that identical authentication values are generated in order to improve the efficiency and reliability of digital signatures pertains to a more effective and secure way for distributed processing of a hash tree. To achieve this object, in the conventional art, a large-scale hash tree is represented as a hierarchical structure comprising hash subtrees, and an individual server is allocated for processing each of the hash subtrees. This conventional method is a method that is optimized in terms of arithmetic efficiency.

However, in the case of the conventional hierarchical distributed processing method, when a server that serves to compute a hash subtree at a high level fails, this causes failure of the systems connected to the server that compute hash subtrees at lower levels.

DOCUMENTS OF RELATED ART (Patent Document 1) Korean Patent Application Publication No. 10-0241349.

SUMMARY OF THE INVENTION

Accordingly, the present invention has been made keeping in mind the above problems, and an object of the present invention is to provide a large-scale simultaneous digital signature service system based on a hash function and a method thereof in which a main agent that requires the generation of a digital signature does not itself generate the digital signature, but digital signatures are simultaneously and stably generated for large-scale data, such as multiple electronic documents and digital data, using a hash function and a hash tree, which are known to be a simple and secure method, to guarantee the integrity of the data in a digital signature-based structure based on multiple servers.

Another object of the present invention is to provide a large-scale simultaneous digital signature service system based on a hash function and a method thereof in which a computation process of a hash tree, which is necessarily required for generating a digital signature in a digital signature system based on a hash tree, may be performed by distributed processing using a more stable method.

In accordance with a first aspect of the present invention to accomplish the above objects, there is provided a system for a large-scale simultaneous digital signature service based on a hash function, including: a plurality of digital signature target terminals; a plurality of digital signature service provision servers for providing a large-scale simultaneous digital signature service based on distributed processing of a hash chain of a hash tree in response to a request to generate a digital signature from each of the digital signature target terminals; a digital signature service configuration server for constructing the hash tree having a hierarchical structure that is preset in order to perform parallel distributed processing for generating a large-scale digital signature according to a digital signature service performance right based on unique authentication information provided by each of the digital signature service provision servers; and a digital signature service relay server for enabling access to any one digital signature service provision server, selected from among currently available digital signature service provision servers, in response to a request for accessing the digital signature service from each of the digital signature target terminals.

In this case, when one of the digital signature service provision servers is newly registered by the digital signature service configuration server, the newly registered digital signature service provision server may transmit a message that requests issue of a unique authentication token for digital signature service interworking authorization to the digital signature service configuration server, using unique authentication information; the digital signature service configuration server may compare the unique authentication information, transmitted from the newly registered digital signature service provision server, with previously stored unique authentication information, generate and encrypt both the unique authentication token for the unique authentication information and information about digital signature service interworking if the newly registered digital signature service provision server has the digital signature service performance right, and transmit the encrypted token and the encrypted information to the newly registered digital signature service provision server; the newly registered digital signature service provision server may decrypt the encrypted unique authentication token and the encrypted information about digital signature service interworking, which are transmitted from the digital signature service configuration server, and transmit a message that requests approval of the digital signature service interworking authorization using the unique authentication token according to a list of digital signature service provision servers to be accessed, which is included in the decrypted information about digital signature service interworking; and each of the digital signature service provision servers to be accessed may decrypt the unique authentication token, transmitted from the newly registered digital signature service provision server, by interworking with the digital signature service configuration server, and transmit a result of the approval of the digital signature service interworking authorization to the newly registered digital signature service provision server when decrypting is successfully performed.

Desirably, the information about digital signature service interworking includes a list of the digital signature service provision servers to be accessed, a position of a hash subtree to be processed, and information about a service right. When the digital signature service provision server performs the large-scale simultaneous digital signature service depending on a specific server administrator, the unique authentication information may include at least one of unique identification information of the server administrator, selected from among an ID and password of the server administrator, biometric information of the server administrator, and authentication information generated by a private key based on a One-Time Password (OTP) and a Public key Infrastructure (PKI), and when the digital signature service provision server performs the large-scale simultaneous digital signature service depending on specific server hardware, the unique authentication information may include at least one of unique identification information of a device, selected from among a name of the device, a password of the device, a serial number of the device, a kind of the device, a manufacturer of the device, a Media Access Control (MAC) address of the device, a unique Internet Protocol (IP) address of the device, a model and version of the device, a secret key of the device, and authentication information of the device, generated by a private key based on a PKI.

Each of the digital signature target terminals may transmit a request message for accessing the digital signature service to the digital signature service relay server; the digital signature service relay server may receive the request message for accessing the digital signature service from each of the digital signature target terminals, generate information for accessing any one digital signature service provision server, selected from among the currently available digital signature service provision servers, and transmit the information for accessing the digital signature service provision server to a corresponding digital signature target terminal; and the corresponding digital signature target terminal may access the corresponding digital signature service provision server using the information for accessing the digital signature service provision server, transmitted from the digital signature service relay server.

The information for accessing the digital signature service provision server may include at least one of a unique IP address of the digital signature service provision server, a kind of a network protocol, and a kind of a messaging protocol.

The system may further include an authentication server that generates and encrypts a unique authentication token and transmits the unique authentication token to a corresponding digital signature target terminal, when entity authentication information, received from each of the digital signature target terminals, is identical to previously stored entity authentication information, wherein each of the digital signature service provision servers may decrypt the unique authentication token, transmitted from each of the digital signature target terminals, by interworking with the authentication server, and transmit a result of approval of authentication to a corresponding digital signature target terminal when the decryption is successfully performed; the corresponding digital signature target terminal may transmit a hash value of digital signature target data, which is generated by a predetermined hash function, along with entity identification information to a digital signature service provision server, which is selected by the digital signature service relay server; and the digital signature service provision server, selected by the digital signature service relay server, may generate a new hash value by combining the hash value of the digital signature target data with the entity identification information, which are transmitted from the corresponding digital signature target terminal, generate a unique digital signature based on a hash chain of the constructed hash tree, using the generated new hash value, and transmit the unique digital signature to the corresponding digital signature target terminal.

When each of the digital signature target terminals is a user terminal with which a specific user requests a digital signature, the entity authentication information may include at least one of unique identification information of the user, selected from among a membership ID and password of the user, a Social Security number, a phone number, biometric information, a One-Time Password (OTP), a Public Key Infrastructure (PKI), and authentication certificate information, and when each of the digital signature target terminals is an electronic device capable of data communication, the entity authentication information may include at least one of unique identification information of the device, selected from among a name of the device, a password of the device, a serial number of the device, a kind of the device, a manufacturer of the device, a Media Access Control (MAC) address of the device, a unique Internet Protocol (IP) address of the device, a model and version of the device, a secret key of the device, and authentication information of the device, generated through a private key based on a PKI.

Desirably, each of the digital signature service provision servers may temporarily store the generated new hash value in a memory queue, and then read the new hash value, temporarily stored in the memory queue, at predetermined time intervals, to be used for construction of the hash tree. Also, each of the digital signature service provision servers may compute a value of a root node of the constructed hash tree by interworking with a digital signature service provision server, linked with the hash chain of the constructed hash tree, and then generate the unique digital signature through the value.

In accordance with a second aspect of the present invention, there is provided a method of performing a large-scale simultaneous digital signature service based on a hash function, using a system including a plurality of digital signature target terminals, a plurality of digital signature service provision servers, and a digital signature service relay server, the method including: (a) constructing, by the digital signature service configuration server, a hash tree having a hierarchical structure that is preset in order to perform parallel distributed processing for generating a large-scale digital signature according to a digital signature service performance right based on unique authentication information provided by each of the digital signature service provision servers; (b) relaying, by the digital signature service relay server, a connection in order to enable access to any one digital signature service provision server, selected from among currently available digital signature service provision servers, in response to a request for accessing a digital signature service from each of the digital signature target terminals; and (c) providing, by the digital signature service provision server selected in step (b), a large-scale simultaneous digital signature service based on distributed processing of a hash chain of the hash tree constructed in step (a) in response to a request to generate a digital signature from each of the digital signature target terminals.

When one of the digital signature service provision servers is newly registered through the digital signature service configuration server, step (a) may include: transmitting, by the newly registered digital signature service provision server, a message that requests issue of a unique authentication token for digital signature service interworking authorization to the digital signature service configuration server, using unique authentication information; by the digital signature service configuration server, comparing the unique authentication information, transmitted from the newly registered digital signature service provision server, with previously stored unique authentication information, generating and encrypting both the unique authentication token for the unique authentication information and information about digital signature service interworking if the newly registered digital signature service provision server has the digital signature service performance right, and transmitting the encrypted token and the encrypted information to the newly registered digital signature service provision server; by the newly registered digital signature service provision server, decrypting the encrypted unique authentication token and the encrypted information about digital signature service interworking, which are transmitted from the digital signature service configuration server, and transmitting a message that requests approval of the digital signature service interworking authorization using the unique authentication token according to a list of digital signature service provision servers to be accessed, which is included in the decrypted information about digital signature service interworking; and by each of the digital signature service provision servers to be accessed, decrypting the unique authentication token, transmitted from the newly registered digital signature service provision server, by interworking with the digital signature service configuration server, and transmitting a result of the approval of the digital signature service interworking authorization to the newly registered digital signature service provision server when the decryption is successfully performed.

Desirably, the information about digital signature service interworking includes a list of the digital signature service provision servers to be accessed, a position of a hash subtree to be processed, and information about a service right. When the digital signature service provision server performs the large-scale simultaneous digital signature service depending on a specific server administrator, the unique authentication information may include at least one of unique identification information of the server administrator, selected from among an ID and password of the server administrator, biometric information of the server administrator, and authentication information generated by a private key based on a One-Time Password (OTP) and a Public key Infrastructure (PKI), and when the digital signature service provision server performs the large-scale simultaneous digital signature service depending on specific server hardware, the unique authentication information may include at least one of unique identification information of a device, selected from among a name of the device, a password of the device, a serial number of the device, a kind of the device, a manufacturer of the device, a Media Access Control (MAC) address of the device, a unique Internet Protocol (IP) address of the device, a model and version of the device, a secret key of the device, and authentication information of the device, generated by a private key based on a PKI.

Step (b) includes: (b-1) transmitting, by each of the digital signature target terminals, a request message for accessing a digital signature service to the digital signature service relay server; and (b-2) by the digital signature service relay server, receiving the request message for accessing the digital signature service, transmitted at step (b-1), generating information for accessing any one digital signature service provision server, selected from among the currently available digital signature service provision servers, and transmitting the information for accessing the digital signature service provision server to a corresponding digital signature target terminal, wherein the corresponding digital signature target terminal may access the corresponding digital signature service provision server using the information for accessing the digital signature service provision server, transmitted in step (b-2).

In step (b-2), the information for accessing the digital signature service provision server may include at least one of a unique IP address of the digital signature service provision server, a kind of a network protocol, and a kind of a messaging protocol.

Step (c) may include: (c-1) requesting, by each of the digital signature target terminals, approval of entity authentication by transmitting entity authentication information to a separate authentication server; (c-2) by the authentication server, generating and encrypting a unique authentication token and transmitting the unique authentication token to a corresponding digital signature target terminal, when the entity authentication information transmitted at step (c-1) is identical to previously stored entity authentication information; (c-3) requesting, by each of the digital signature target terminals, approval of entity authentication by transmitting the unique authentication token transmitted in step (c-2) to the digital signature service provision server; (c-4) by the digital signature service provision server, decrypting the unique authentication token transmitted in step (c-3) by interworking with the authentication server, and transmitting a result of approval of the authentication to a corresponding digital signature target terminal when decrypting is successfully performed; (c-5) requesting, by the corresponding digital signature target terminal, a digital signature by transmitting a hash value of digital signature target data, which is generated by a predetermined hash function, along with entity identification information to the digital signature service provision server, which is selected by the digital signature service relay server; and (c-6) by the digital signature service provision server selected by the digital signature service relay server, generating a new hash value by combining the hash value of the digital signature target data with the entity identification information, which are transmitted in step (c-5), generating a unique digital signature based on a hash chain of the constructed hash tree by using the generated new hash value, and transmitting the unique digital signature to the corresponding digital signature target terminal.

When each of the digital signature target terminals is a user terminal with which a specific user requests a digital signature, the entity authentication information may includes at least one of unique identification information of the user, selected from among a membership ID and password of the user, a Social Security number, a phone number, biometric information, a One-Time Password (OTP), a Public Key Infrastructure (PKI), and authentication certificate information, and when each of the digital signature target terminals is an electronic device capable of data communication, the entity authentication information may include at least one of unique identification information of the device, selected from among a name of the device, a password of the device, a serial number of the device, a kind of the device, a manufacturer of the device, a Media Access Control (MAC) address of the device, a unique Internet Protocol (IP) address of the device, a model and version of the device, a secret key of the device, and authentication information of the device generated through a private key based on a PKI.

In step (c-6), each of the digital signature service provision servers may temporarily store the generated new hash value in a memory queue, and then read the generated new hash value, temporarily stored in the memory queue, at predetermined time intervals, to be used for construction of the hash tree. Also, each of the digital signature service provision servers may compute a value of a root node of the constructed hash tree by interworking with a digital signature service provision server, linked with the hash chain of the constructed hash tree, and then generate the unique digital signature through the value.

In accordance with a third aspect of the present invention, there is provided a computer-readable recording medium in which a program for implementing the above-mentioned method of performing a large-scale simultaneous digital signature service based on a hash function is recorded.

The method of performing a large-scale simultaneous digital signature service based on a hash function according to the present invention may be implemented as computer-readable code recorded on a computer-readable storage medium. The computer-readable storage medium includes all kinds of storage media in which data that can be interpreted by a computer system are stored.

For example, the computer-readable storage medium may include ROM, RAM, CD-ROM, a magnetic tape, a hard disk, a floppy disk, a portable storage device, flash memory, optical data storage, and the like.

BRIEF DESCRIPTION OF THE DRAWINGS

The above and other objects, features and other advantages of the present invention will be more clearly understood from the following detailed description when taken in conjunction with the accompanying drawings, in which:

FIG. 5 is a concept diagram illustrating a method for selecting the digital signature service provision server to be synchronized in the distributed processing of a hash tree that is applied to an embodiment of the present invention;

DETAILED DESCRIPTION OF THE INVENTION

Figure 1:
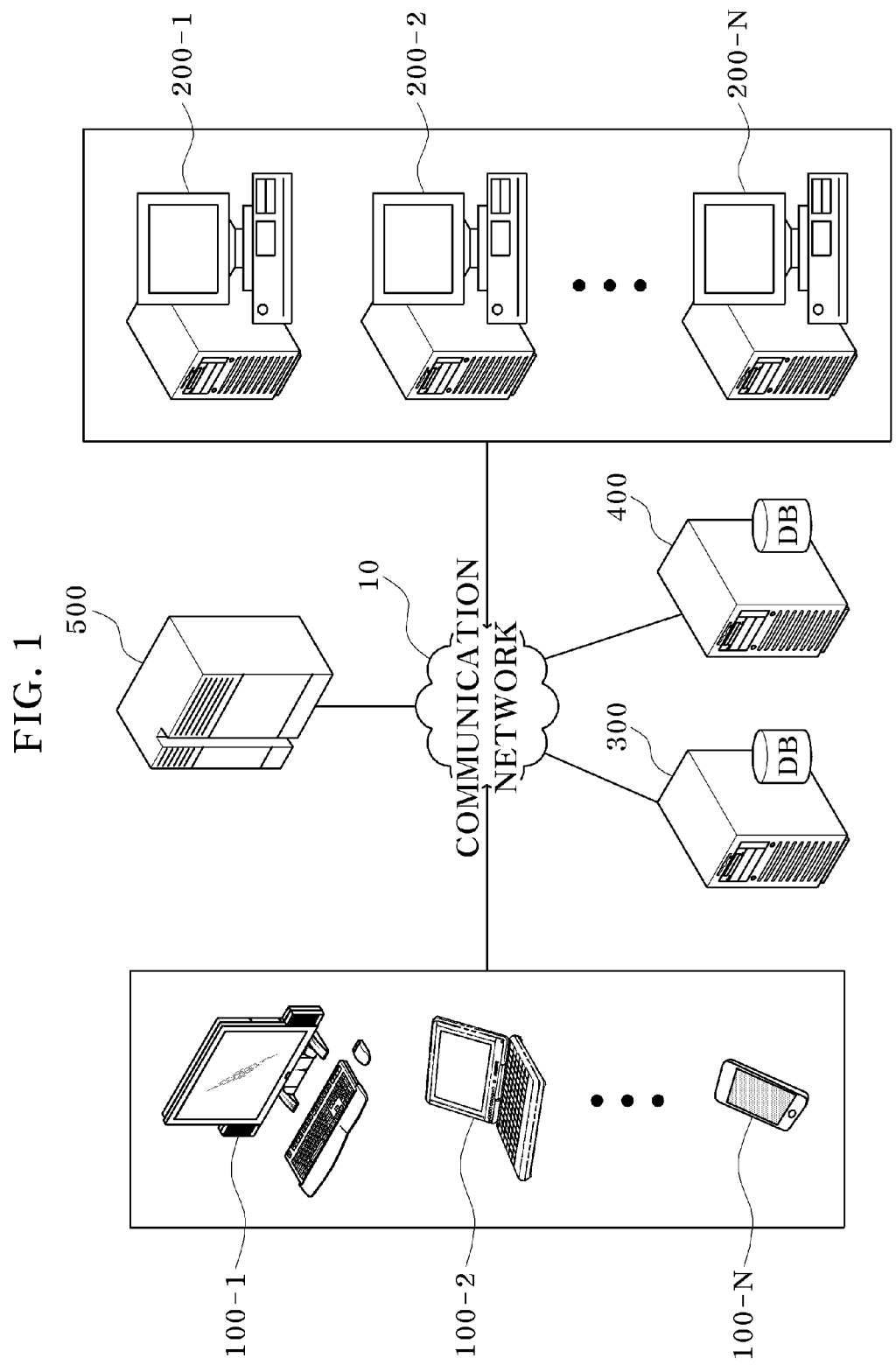
FIG. 1 is a block diagram illustrating an entire large-scale simultaneous digital signature service system based on a hash function according to an embodiment of the present invention.

The above-described objects, features, and advantages are described in detail with reference to the accompanying drawings so that those having ordinary knowledge in the technical field to which the present invention pertains can easily practice the present invention. In the following description of the present invention, detailed descriptions of known functions and configurations which are deemed to make the gist of the present invention obscure will be omitted.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element. The terminology used herein is for the purpose of describing particular embodiments only and is not intended to be limiting. As used herein, the singular forms "a," "an" and "the" are intended to include the plural forms as well, unless the context clearly indicates otherwise.

Although general terms that are widely used at present were selected as terminology used in the exemplary embodiments while considering the functions of the exemplary embodiments, they may vary according to the intentions of one of ordinary skill in the art, judicial precedents, the advent of new technologies, and the like. Terms arbitrarily selected by the applicant may also be used in a specific case. In this case, their meanings can be obtained based on the detailed description of the exemplary embodiments. Hence, the tams must be defined based on the meanings of the terms and the contents of the entire specification, and not by simply stating the terms themselves.

It will be further understood that the terms "comprise", "include", "have", etc. when used in this specification, specify the presence of stated features, integers, steps, operations, elements, components, and/or combinations thereof, but do not preclude the presence or addition of one or more other features, integers, steps, operations, elements, components, and/or combinations thereof.

Hereinafter, exemplary embodiments of the present invention will be described in detail. However, the present invention is not limited to the exemplary embodiments disclosed below, but can be implemented in various forms. The following exemplary embodiments are provided in order to enable those of ordinary skill in the art to completely understand the present invention.

Blocks in the accompanying block diagrams, steps in the accompanying flowcharts, and combinations thereof may be performed by program instructions (execution engines). Because these program instructions are stored in processors of general purpose computers, special purpose computers, or other programmable data processing devices, the instructions that are processed by the processor of computers or other programmable data processing devices generate a means for performing the functions described in the blocks of the block diagram and steps of the flowchart. Because these computer program instructions may be stored in a computer for implementing functions in a specific way or computer-usable or computer-readable memory that may support other programmable data processing devices, the instructions stored in the computer-usable or computer-readable memory may produce products containing an instruction execution means for implementing the functions described in the blocks of the block diagrams and the steps of the flowcharts.

Also, because the computer program instructions may be stored in computers or other programmable data processing devices, a series of operational steps is executed on the computers or other programmable data processing devices so as to generate processes executable by computers, and thus the instructions may provide steps for implementing the functions described in the blocks of the block diagrams and the steps of the flowcharts.

Also, each of the blocks or each of the steps may indicate a module, a segment, or a part of code, including one or more executable instructions for specific logical functions, and it should be noted that the functions mentioned in the blocks or steps may be executed in a different order in some alternative embodiments. For example, two successively illustrated blocks or steps may be executed simultaneously in practice. Also, if necessary, the blocks or steps may be executed in reverse order.

Figure 2:
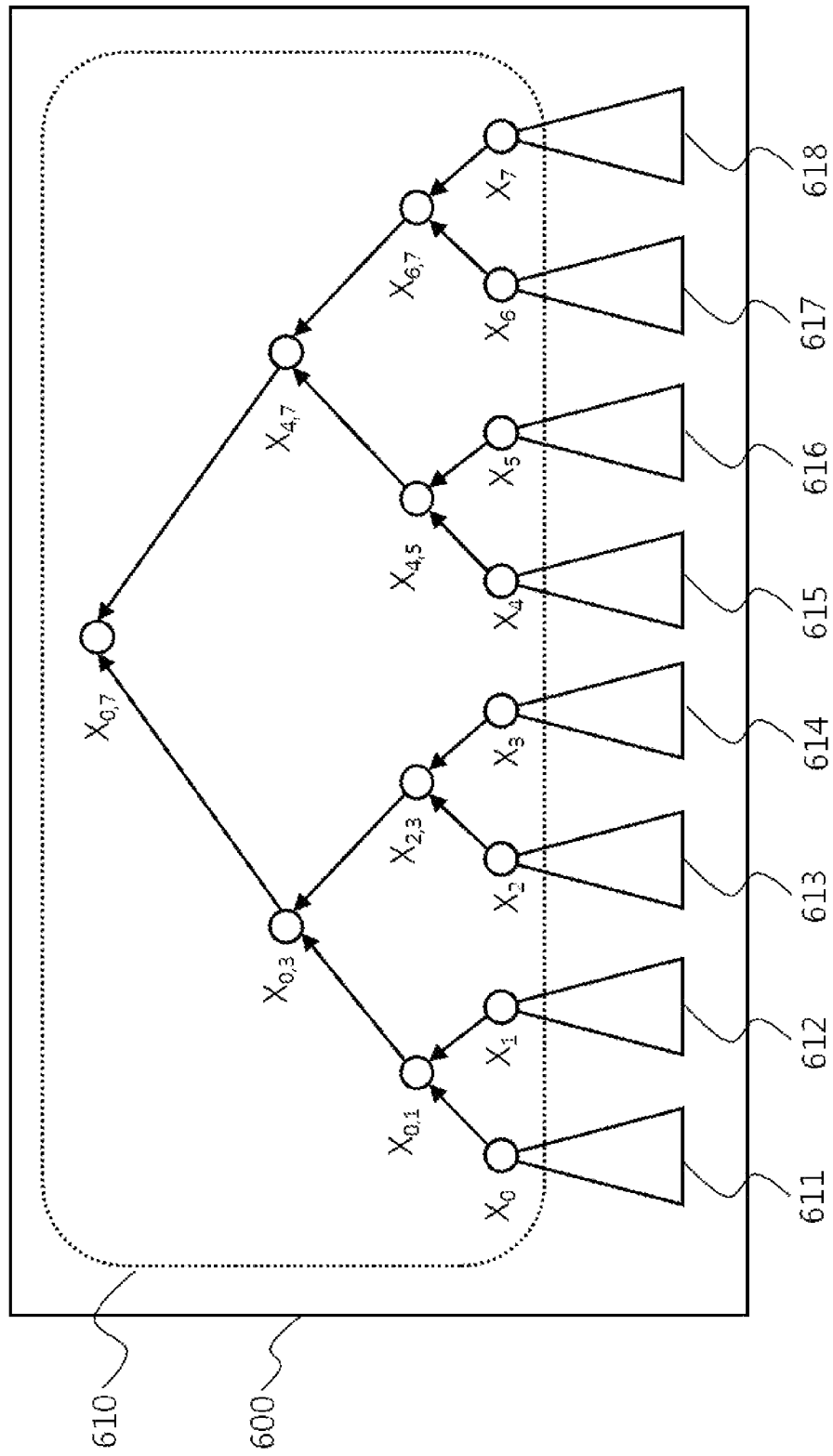
FIG. 2 is a concept diagram illustrating the distributed processing of a hash tree that is applied to an embodiment of the present invention.
Figure 3:
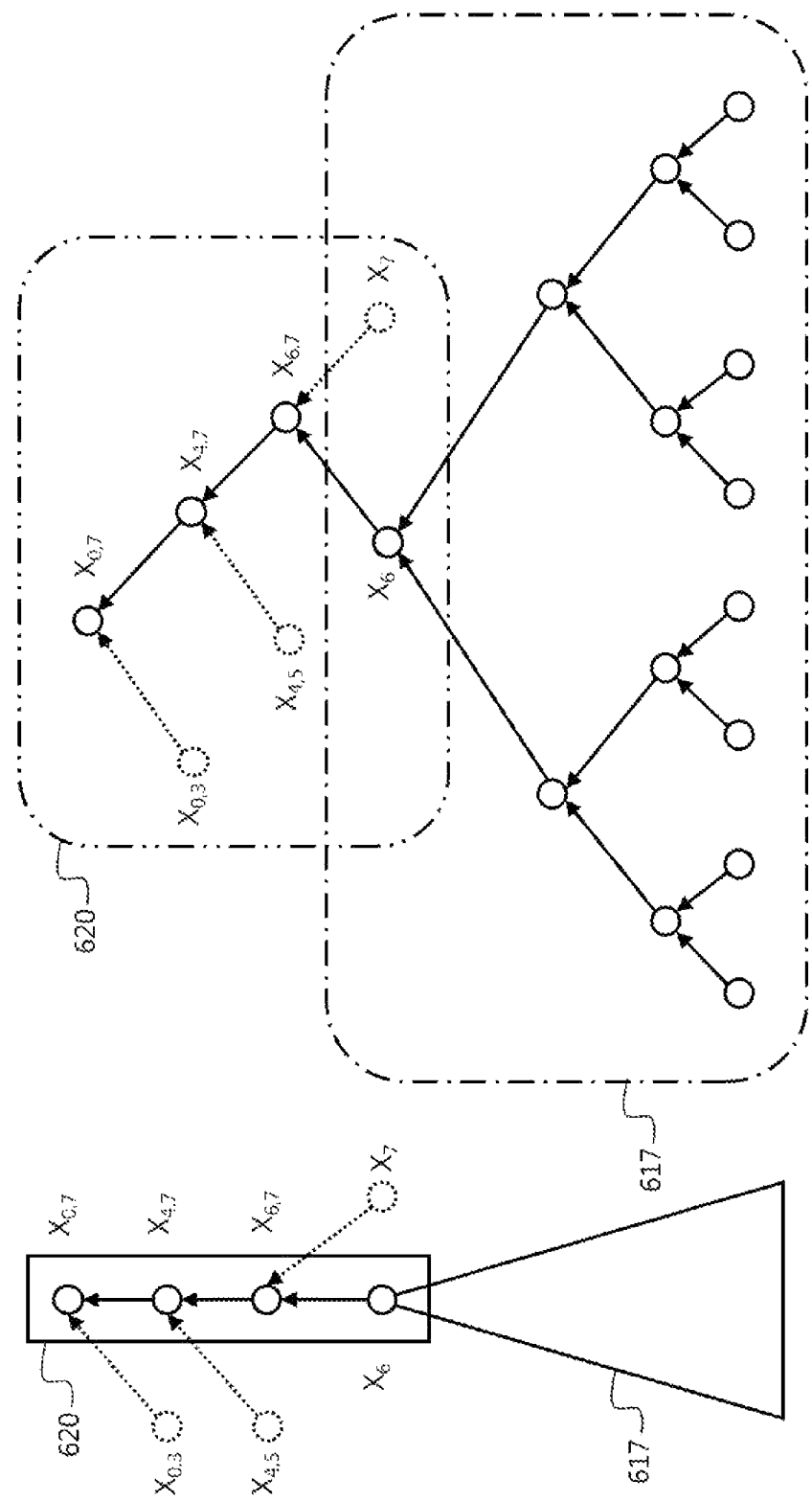
FIG. 3 is a concept diagram illustrating the process performed by a digital signature service provision server in the distributed processing of a hash tree that is applied to an embodiment of the present invention.
Figure 4:
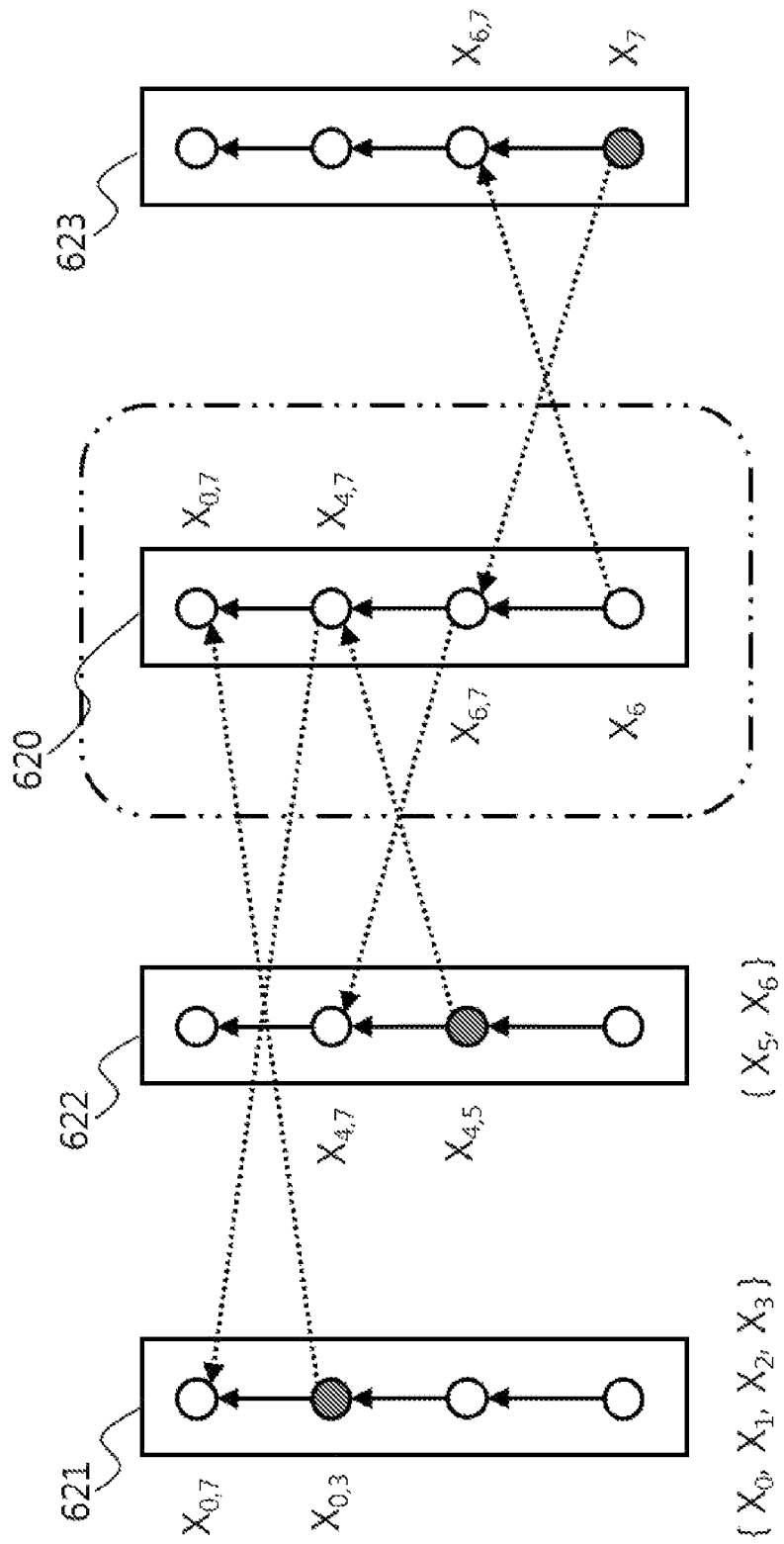
FIG. 4 is a concept diagram illustrating the process of synchronization of a plurality of digital signature service provision servers in the distributed processing of a hash tree that is applied to an embodiment of the present invention.

FIG. 1 is a block diagram illustrating an entire large-scale simultaneous digital signature service system based on a hash function according to an embodiment of the present invention, FIG. 2 is a concept diagram illustrating the distributed processing of a hash tree that is applied to an embodiment of the present invention, FIG. 3 is a concept diagram illustrating the process performed by a digital signature service provision server in the distributed processing of a hash tree that is applied to an embodiment of the present invention, FIG. 4 is a concept diagram illustrating the process in which a plurality of digital signature service provision servers synchronize with each other in the distributed processing of a hash tree that is applied to an embodiment of the present invention, and FIG. 5 is a concept diagram illustrating a method for selecting a digital signature service provision server to be synchronized in the distributed processing of a hash tree that is applied to an embodiment of the present invention.

Referring to FIGS. 1 to 5, the large-scale simultaneous digital signature service system based on a hash function according to an embodiment of the present invention may be configured to include a plurality of digital signature target terminals 100-1 to 100-N, a plurality of digital signature service provision servers 200-1 to 200-N, a digital signature service configuration server 300, a digital signature service relay server 400, and the like. Also, the large-scale simultaneous digital signature service system based on a hash function may further include an authentication server 500 and the like.

Here, each of the digital signature target terminals 100-1 to 100-N is connected to each of the digital signature service provision servers 200-1 to 200-N, the digital signature service configuration server 300, the digital signature service relay server 400, and the authentication server 500 through a communication network 10. Here, the communication network 10 is a high-speed backbone network of a large-scale communication network, in which high-capacity, long-distance voice and data services are available, and may be a next-generation wireless network including Wi-Fi, Wibro, Wimax, or the like, which provides Internet or high-speed multimedia services.

The Internet means a global open computer network architecture that provides various services based on the TCP/IP protocol and higher levels thereof, namely, Hyper Text Transfer Protocol (HTTP), Telnet, File Transfer Protocol (FTP), Domain Name System (DNS), Simple Mail Transfer Protocol (SMTP), Simple Network Management Protocol (SNMP), Network File Service (NFS), Network Information Service (NIS), and the like. Also, the Internet provides an environment in which each of the digital signature target terminals 100-1 to 100-N can connect to each of the digital signature service provision servers 200-1 to 200-N, the digital signature service configuration server 300, the digital signature service relay server 400, and the authentication server 500. Meanwhile, the Internet may be the wired or wireless Internet, and besides, it may be a wired public network, a wireless mobile communication network, or a core network integrated with a mobile Internet.

If the communication network 10 is a mobile communication network, it may be either a synchronous mobile communication network or an asynchronous mobile communication network. As an embodiment of the asynchronous mobile communication network, there is a Wideband Code Division Multiple Access (WCDMA) Network. In this case, although not illustrated in the drawing, the mobile communication network may include, for example, a Radio Network Controller (RNC) and the like. Meanwhile, although the WCDMA network is presented as an example, the mobile communication network may be a next-generation network including a 3G LTE network, a 4G network, a 5G network, and the like, or an IP network based on IP. The communication network 10 serves to deliver signals and data between each of the digital signature target terminals 100-1 to 100-N, each of the digital signature service provision servers 200-1 to 200-N, the digital signature service configuration server 300, the digital signature service relay server 400, and the authentication server 500.

Also, each of the digital signature target terminals 100-1 to 100-N transmits a request message for accessing a digital signature service to the digital signature service relay server 400, and accesses a corresponding digital signature service provision server 200-1 to 200-N using the information for accessing the digital signature service provision server, transmitted from the digital signature service relay server 400.

Also, each of the digital signature target terminals 100-1 to 100-N requests the approval of entity authentication by transmitting unique entity authentication information to the authentication server 500, and receives an encrypted unique authentication token from the authentication server 500 when the requested entity authentication is successfully approved.

Also, after receiving the encrypted unique authentication token from the authentication sever 500, each of the digital signature target terminals 100-1 to 100-N requests the digital signature service provision server 200-1 to 200-N to approve the entity authentication again, using the encrypted unique authentication token, and receives an entity authentication approval result from the digital signature service provision server 200-1 to 200-N when the requested entity authentication is successfully approved.

Also, when it receives the entity authentication approval result from the digital signature service provision server 200-1 to 200-N, each of the digital signature target terminals 100-1 to 100-N generates a hash value of digital data for which it is intended to acquire a digital signature (hereinafter, referred to as 'digital signature target data') using a predetermined hash function, and transmits the generated hash value of the digital signature target data along with unique entity identification information to the digital signature service provision server 200-1 to 200-N in order to request the digital signature.

Here, the hash function is a function for mapping a binary string having an arbitrary length to a binary string having a fixed length, and provides a result by cutting, replacing, and shifting data. This result is called a hash value. The hash function is one of the main functions used for implementing data integrity functions, data authentication, and non-repudiation.

Meanwhile, the unique entity identification information is information for identifying the entity for which it is intended to acquire a digital signature, and it is desirable for it to comprise security-insensitive information, such as information supplementary to the signature. For example, if the entity that intends to receive a digital signature is an electronic device, the unique identification information may include temporary authentication information generated during a previous authentication process (for example, a session key, etc).

Also, each of the digital signature target terminals 100-1 to 100-N receives a generated unique digital signature from the digital signature service provision server 200-1 to 200-N and stores it in separate storage (not illustrated) to be managed, in which the unique digital signature is stored in a database such that the digital signature is associated with the digital signature target data.

Here, each of the digital signature target terminals 100-1 to 100-N may be implemented as two types, that is, a user terminal for requesting a digital signature of an electronic document or digital data (or message) written by a specific user, and an electronic device capable of data communication.

Here, generally, the user terminal is a computer, for example, a Personal Computer (PC), a laptop, etc, but may be all kinds of wired or wireless communication devices without limitation to the above example.

For example, the user terminal includes various mobile terminals that communicate through the wireless Internet or mobile Internet, and additionally may include all kinds of wired and wireless appliance/communication devices having a user interface for accessing each of the digital signature service provision servers 200-1 to 200-N, the digital signature service configuration server 300, the digital signature service relay server 400, and the authentication server 500, such as Palm PCs, smart phones, mobile play-stations, Digital Multimedia Broadcasting (DMB) phones having a communication function, tablet PCs, iPads, and the like.

Particularly, when the user terminal is implemented as a common smart phone, the smart phone may be understood as a phone based on an open operating system, in which a user may download various desired applications and freely use or delete the applications, unlike a feature phone. Also, it may be all mobile phones having a mobile office function in addition to generally used voice/video call functions, an Internet data communication function, and the like, or communication devices, including all Internet devices and tablet PCs, that do not have a voice call function but may access the Internet.

The above-mentioned smart phones may be implemented as a smart phone in which various open operating systems are installed, and the open operating systems may be, for example, Nokia Symbian OS, BlackBerry OS, Apple iOS, Microsoft Windows Mobile, Google Android, Samsung Bada OS, and the like.

As described above, because the smart phones use open operating systems, unlike a mobile phone having a closed OS, a user may freely install and manage various applications.

Also, the smart phone basically includes a control unit, a memory unit, a display unit, a key input unit, a sound output unit, a sound input unit, a camera unit, a wireless communication module, a near field communication module, a battery for providing power, and the like.

Meanwhile, electronic devices capable of data communication may be electronic devices capable of all kinds of wired and wireless data communication, which are intended to acquire digital signatures and may output digital data. For example, they may comprise objects for large-scale simultaneous digital signatures (for example, CCTV cameras for surveillance use, smart phones, PCs, cars, refrigerators, washing machines, clocks, and the like) in an Internet of Things (IoT) environment.

If each of the digital signature target terminals 100-1 to 100-N is a user terminal with which a specific user requests a digital signature, it is desirable that the entity authentication information include at least one of unique user identification information, selected from among a membership ID and password of the user, a Social Security number, a phone number, biometric information, a One-Time Password (OTP), a Public Key Infrastructure (PKI), and authentication certificate information, but may include any unique identification information capable of identifying the specific user without limitation to the above examples.

In this case, the biometric information is an unforgeable factor and may be, for example, a fingerprint, iris, face, blood vessel, glottis, signature, voice, retina, flexion crease, and the like. Either a fingerprint or iris may be registered for biometric information. According to need, multiple factors may be registered for biometric information.

Meanwhile, if each of the digital signature target terminals 100-1 to 100-N is an electronic device capable of data communication, it is desirable that the entity authentication information include at least one of unique device identification information, selected from among the name of the device, the password of the device, the serial number of the device, the kind of the device, the manufacturer of the device, the Media Access Control (MAC) address of the device, the unique Internet Protocol (IP) address of the device, the model of the device, the secret key of the device, and the authentication information of the device, generated by a private key based on a PKI, but may include any device identification information capable of identifying the device without limitation to the above examples.

Also, each of the digital signature service provision servers 200-1 to 200-N is connected to each of the digital signature target terminals 100-1 to 100-N, the digital signature service configuration server 300, the digital signature service relay server 400, and the authentication server 500 through the communication network 10, and is a server for simultaneously generating and providing digital signatures for large-scale data, such as multiple electronic documents and digital data, so as to guarantee the integrity thereof. Each of the digital signature service provision servers 200-1 to 200-N serves to provide large-scale simultaneous digital signature service based on distributed processing of the hash chain of a hash tree in response to the request to generate a digital signature from each of the digital signature target terminals 100-1 to 100-N.

Also, each of the digital signature service provision servers 200-1 to 200-N serves to decrypt the unique authentication token, transmitted from the digital signature target terminals 100-1 to 100-N, by interworking with the authentication server 500.

Also, when it successfully decrypts the unique authentication token, transmitted from each of the digital signature target terminals 100-1 to 100-N, each of the digital signature service provision servers 200-1 to 200-N transmits the authentication approval result to the corresponding digital signature target terminal 100-1 to 100-N.

Also, each of the digital signature service provision servers 200-1 to 200-N generates a new hash value by combining the hash value of the digital signature target data with the entity identification information, which are transmitted from each of the digital signature target terminals 100-1 to 100-N.

Also, each of the digital signature service provision servers 200-1 to 200-N generates a unique digital signature based on the hash chain of a hash tree that is constructed by a digital signature service configuration server 300, and transmits the unique digital signature to the corresponding digital signature target terminal 100-1 to 100-N.

Also, each of the digital signature service provision servers 200-1 to 200-N temporarily stores the new hash value in the memory queue, reads the new hash value, which is temporarily stored in the memory queue, at predetermined time intervals to be used for the construction of the hash tree, computes the value of the root node of the constructed hash tree by interworking with the digital signature service provision server linked to the hash chain of the constructed hash tree, and generates a unique digital signature using this value.

Meanwhile, it is desirable for each of the digital signature service provision servers 200-1 to 200-N applied to an embodiment of the present invention to construct the hash tree by reading the new hash value, temporarily stored in the memory queue, at predetermined time intervals, but, without limitation thereto, the hash tree may be constructed by sequentially reading the new hash value according to an order stored in the memory queue based on a predetermined amount of data or a predetermined number of pieces of data.

Meanwhile, the hash tree means a tree consisting of hash values. In the hash tree, each leaf node indicates a value acquired by hashing a data block, and an intermediate node of the tree has one or more child nodes.

Therefore, the intermediate node of the tree has a hash value that combines the hash values of the child nodes. The root node has a hash value that represents the data block of all the child nodes.

It is desirable to use a Merkle hash tree structure for the hash tree, and this structure is effective in verifying the integrity of data that has been divided into multiple blocks. Also, it is possible to verify the integrity of large-scale data by suitably adjusting the height of the hash tree.

According to the structure of the above-mentioned hash tree, unique data values may be generated using the characteristic of the hash tree without the use of keys, and only a linear hash operation need be performed, without the need for algebraic operations. Also, a hash chain for a large amount of data may be generated through the construction of a large-scale hash tree.

Particularly, the digital signature generation process based on a hash tree is distributed among the digital signature service provision servers 200-1 to 200-N by the digital signature service configuration server 300.

In this case, the target of the digital signature service processed by each of the digital signature provision servers 200-1 to 200-N may be the digital signature target terminal 100-1 to 100-N that accesses each of the digital signature service provision servers 200-1 to 200-N through the relay process of the digital signature service relay server 400.

Also, each of the digital signature service provision servers 200-1 to 200-N may accept the request to generate a digital signature only from the digital signature target terminals 100-1 to 100-N for which the entity authentication has successfully been approved by the authentication server 500.

Meanwhile, FIG. 2 illustrates the case in which there are eight digital signature service provision servers 200-1 to 200-N. In order to provide large-scale simultaneous digital signature service based on a hash tree, the digital signature service provision servers 200-1 to 200-N construct a single hash tree 600 at the time at which the generation of a digital signature is required, as shown in FIG. 2. Then, parallel distributed processing of the single hash tree 600 is performed using the digital signature service provision servers 200-1 to 200-N. In this case, the low-level trees 611 to 618, which are subtrees of the single hash tree 600, are processed individually by the digital signature service provision servers 200-1 to 200-N.

In contrast to the case of the lower subtrees 611 to 618, the upper subtree 610 is processed by being distributed among the digital signature service provision servers 200-1 to 200-N in order to compute the hash chain that ranges from the leaf nodes $X_0$ to $X_7$ of the hash tree 610 to the hash value of the root node $X_{0,7}$. In this case, the distribution method is determined depending on the values that are the hash values of the root nodes of the lower subtrees 611 to 618 and are also the hash values of the leaf nodes of the upper subtree 610.

In FIG. 2, the lower subtree 617 and the hash chain 620 of the upper subtree 610 are computed by the digital signature service provision server 200-7. In this case, the nodes of the hash tree, processed by the digital signature provision server 200-7, are illustrated in FIG. 3.

Specifically, the lower subtree 617 is a hash tree having the form of a complete binary tree, and the hash chain 620 is represented by the mathematical symbols $\{X_6; 011(2); X_7, X_{4,5}, X_{0,3}\}$. In this case, because the hash values of $X_7$, $X_{4,5}$, and $X_{0,3}$ included in the hash chain are not computed in the computation process of the lower subtree 617, the hash values of $X_7$, $X_{4,5}$, and $X_{0,3}$, computed by the digital signature service provision servers 200-1 to 200-6 and 200-8 to 200-N, but not the digital signature provision server 200-7, may be received and used for the computation of the hash chain.

Among the nodes to be processed by the digital signature service provision server 200-7, described with reference to FIG. 3, the hash values of the nodes $X_7$, $X_{4,5}$, and $X_{0,3}$, computed by the digital signature service provision servers 200-1 to 200-6 and 200-8 to 200-N, are transmitted as shown in FIG. 4.

Because the node $X_7$ is included only in the digital signature service provision server 200-8, the hash value thereof is transmitted from the corresponding server. The hash value of $X_{4,5}$ is transmitted from two digital signature service provision servers 200-5 and 200-6, which respectively include the nodes $X_4$ and $X_5$. The hash value of the node $X_{0,3}$ is transmitted from the four digital signature service provision servers 200-1 to 200-4, which include the nodes $X_0$, $X_1$, $X_2$, and $X_3$. Also, the digital signature service provision server 200-7 receives the hash values of nodes as mentioned above, but may transmit the hash values of the nodes $X_6$, $X_{6,7}$, and $X_{4,7}$, which are computed by itself, to the digital signature provision servers 200-1 to 200-6 and 200-8 to 200-N.

FIGS. 3 and 4 describe the process in which the digital signature service provision server 200-7 computes the hash value of the root node $X_{0,7}$. Generally, there are many methods in which digital signature service provision servers to be interconnected with each other are selected from among the digital signature service provision servers 200-1 to 200-N in order to share the hash value of nodes between them. These methods may be represented by the N×N matrix shown in FIG. 5. Here, if the value of an element in the matrix is '0', it means that the two digital signature service provision servers are not interconnected with each other, whereas if the value is '1', it means that they are interconnected with each other. This matrix is the equivalent to a transposed matrix thereof. Therefore, the matrix of FIG. 5 may be determined only using the elements of the upper triangular matrix or the lower triangular matrix.

Specifically, when the minimum number of interconnections is considered for the digital signature service provision servers 200-1 to 200-N, a single digital signature service provision server may access $\log_2 N$ other digital signature service provision servers according to the characteristic of the tree. Conversely, when the maximum number of interconnections is considered, access to 'N−1' digital signature service provision servers is allowed.

Particularly, when the minimum number of interconnections is considered under the condition in which there are sixteen digital signature service provision servers 200-1 to 200-N, the matrix shown in FIG. 5 may be taken as an example. Besides the matrix of FIG. 5, the partial matrixes denoted by the lines may be any matrix that may be acquired by permutations of the order for arranging a base vector having a length of 1 in the vector space on the prime field $Z_2$ that the partial matrixes can represent. However, the values of partial matrixes that include the diagonal elements of the original matrix, which are represented in gray, are consistent without being changed. This rule may be applied regardless of the number of digital signature service provision servers 200-1 to 200-N.

Meanwhile, unless the minimum number of interconnections between the digital signature service provision servers 200-1 to 200-N is considered, a random interconnection may be added to the interconnections represented in the matrix that is acquired by considering the minimum number of interconnections, as described above.

Also, the digital signature service configuration server 300 is connected to each of the digital signature target terminals 100-1 to 100-N, each of the digital signature service provision servers 200-1 to 200-N, the digital signature service relay server 400, and the authentication server 500 through the communication network 10, and serves to construct a hash tree having a hierarchical structure that is preset for parallel distributed processing in order to generate large-scale digital signatures according to the digital signature service performance right based on the unique authentication information, provided by each of the digital signature service provision servers 200-1 to 200-N.

When the digital signature service configuration server 300 registers a new digital signature service provision server 200-1 to 200-N, the new digital signature service provision server (for example, 200-N) transmits a message that requests the issue of a unique authentication token for digital signature service interworking authorization to the digital signature configuration server 300, using unique authentication information.

In this case, the digital signature service configuration server 300 receives the unique authentication information, transmitted from the corresponding new digital signature service provision server 200-N, and compares it with previously stored unique authentication information. If the corresponding digital signature service provision server 200-N has the digital signature service performance right, the digital signature service configuration server 300 generates and encrypts not only a unique authentication token for the corresponding unique authentication information but also information about digital signature service interworking, and then transmits them to the corresponding digital signature service provision server 200-N.

Meanwhile, it is desirable that the information about digital signature service interworking include, for example, a list of digital signature service provision servers to be connected, the position of the hash subtree to be processed by the corresponding digital signature service provision server, information about the service right, and the like.

Also, when the digital signature service provision servers 200-1 to 200-N performs large-scale simultaneous digital signature service depending on a specific server administrator, it is desirable that the unique authentication information include at least one of unique identification information of the server administrator, selected from among an ID and password of the server administrator, biometric information of the server administrator, and authentication information generated by a private key based on a One-Time Password (OTP) and Public Key Infrastructure (PKI).

Also, when the digital signature service provision servers 200-1 to 200-N perform large-scale simultaneous digital signature service depending on the hardware of a specific server, it is desirable that the unique authentication information include at least one of unique device identification information, selected from among the name of the device, the password of the device, the serial number of the device, the kind of the device, the manufacturer of the device, the Media Access Control (MAC) address of the device, the unique Internet Protocol (IP) address of the device, the model and version of the device, the secret key of the device, and authentication information of the device, generated by a private key based on a PKI.

The digital signature service relay server 400 is connected to each of the digital signature target terminals 100-1 to 100-N, each of the digital signature service provision servers 200-1 to 200-N, the digital signature service configuration server 300, and the authentication server 500 through the communication network 10, and serves to connect a digital signature target terminal to a single digital signature service provision server, arbitrarily selected from among the available digital signature service provision servers, in response to the request for accessing the digital signature service from each of the digital signature target terminals 100-1 to 100-N.

In other words, the digital signature service relay server 400 receives a message for requesting access to a digital signature service from each of the digital signature target terminals 100-1 to 100-N, generates information for accessing any one digital signature service provision server, selected from among the available digital signature service provision servers, and transmits the information to the corresponding digital signature target terminal 100-1 to 100-N.

In this case, the information for accessing the digital signature service provision server desirably includes the unique IP address of the digital signature service provision server and at least one of the kind of network protocol and the kind of messaging protocol.

Also, the authentication server 500 is connected to each of the digital signature target terminals 100-1 to 100-N, each of the digital signature service provision servers 200-1 to 200-N, the digital signature service configuration server 300, and the digital signature service relay server 400 through the communication network 10. The authentication server 500 receives unique entity authentication information transmitted from each of the digital signature target terminals 100-1 to 100-N and compares it with unique entity authentication information that has been previously stored in a separate database. When the two pieces of authentication information are identical to each other, the authentication server 500 generates and encrypts a unique authentication token and transmits it to the corresponding digital signature target terminal 100-1 to 100-N.

Also, the authentication server 500 interworks with each of the digital signature service provision servers 200-1 to 200-N and shares encryption and decryption keys for the encrypted authentication token in order to encrypt and decrypt the unique authentication token.

In this case, the unique authentication token is electronic information, and is the entity authentication information that is encrypted by the authentication server 500. Here, the unique authentication token is to be transmitted to the digital signature service provision server 200-1 to 200-N to indicate that each of the digital signature target terminals 100-1 to 100-N, which intends to use the digital signature service, is a properly registered digital signature target terminal.

This unique authentication token may be encrypted and decrypted through a symmetric cryptosystem using a symmetric key or an asymmetric cryptosystem using an asymmetric key.

Hereinafter, a large-scale simultaneous digital signature service method based on a hash function according to an embodiment of the present invention will be described in detail.

Figure 6:
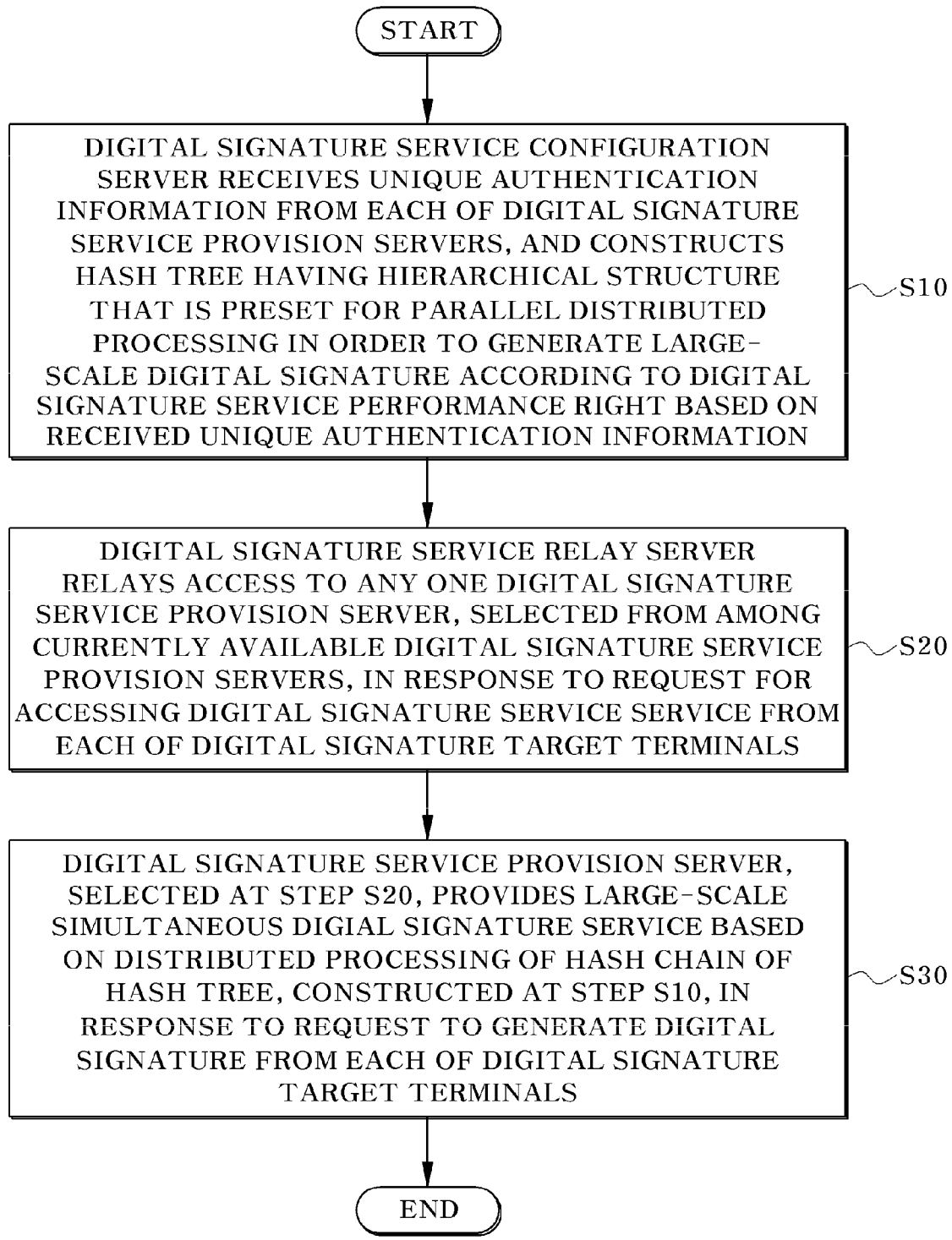
FIG. 6 is a flowchart illustrating an entire large-scale simultaneous digital signature service method based on a hash function according to an embodiment of the present invention.

FIG. 6 is a flowchart illustrating the entire large-scale simultaneous digital signature service method based on a hash function according to an embodiment of the present invention.

Referring to FIGS. 1 to 6, in the large-scale simultaneous digital signature service method based on a hash function according to an embodiment of the present invention, the digital signature service configuration server 300 receives unique authentication information from each of the digital signature service provision servers 200-1 to 200-N and constructs a hash tree having a hierarchical structure that is preset for parallel distributed processing in order to generate the large-scale digital signature according to the digital signature service performance right based on the received unique authentication information at step S10.

Then, the digital signature service relay server 400 relays the connection to any one digital signature service provision server, selected from among the available digital signature service provision servers, at step S20, in response to the request for accessing digital signature service from each of the digital signature target terminals 100-1 to 100-N.

Subsequently, the digital signature service provision server 200-1 to 200-N, selected at step S20, provides large-scale simultaneous digital signature service at step S30 based on distributed processing of the hash chain of the hash tree, which is constructed at step S10, in response to the request to generate the digital signature from each of the digital signature target terminals 100-1 to 100-N.

Figure 7:
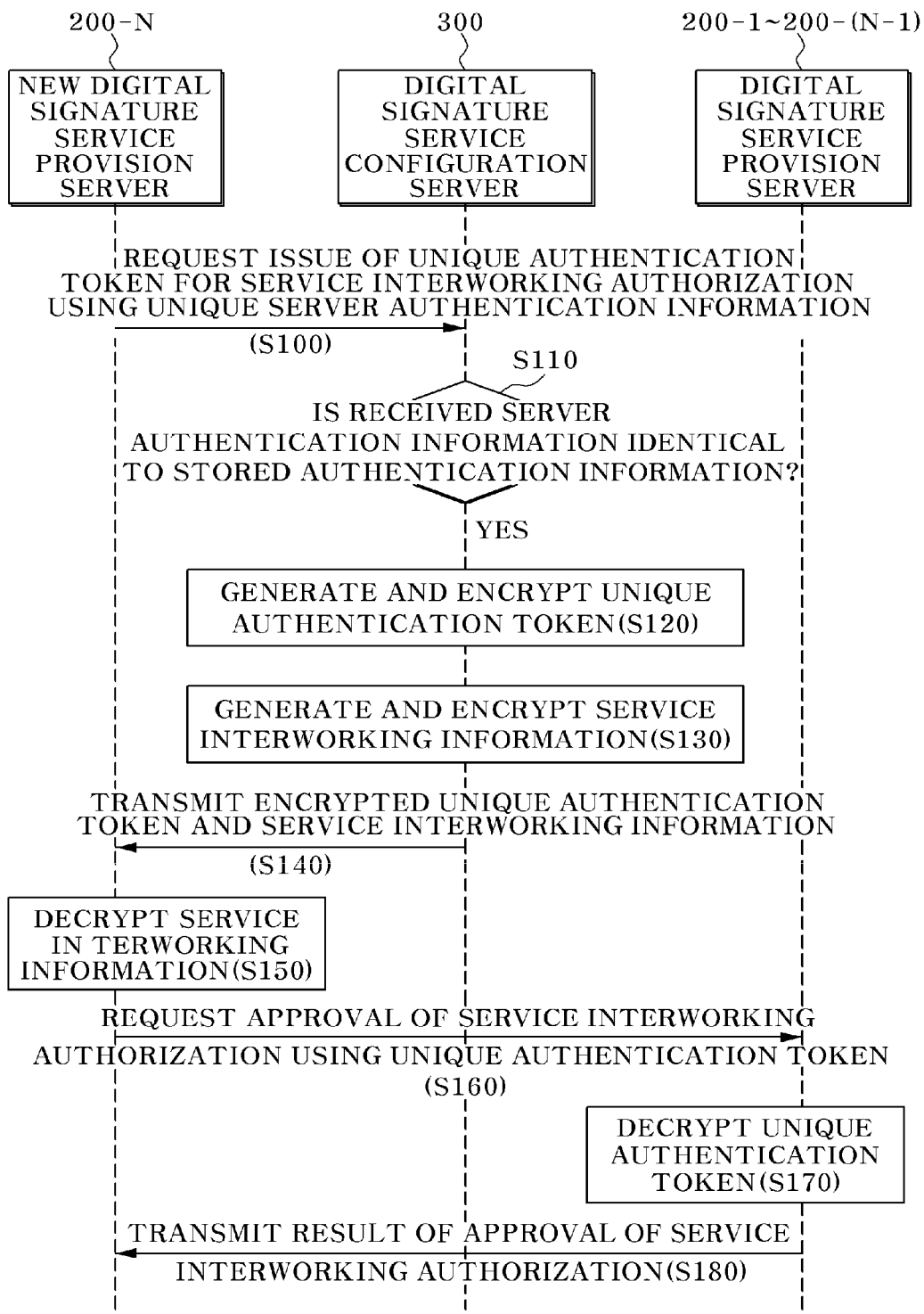
FIG. 7 is a flowchart illustrating a method for registering a new digital signature service provision server in a large-scale simultaneous digital signature service method based on a hash function according to an embodiment of the present invention.

FIG. 7 is a flowchart illustrating a method for registering a new digital signature service provision server in a large-scale simultaneous digital signature service method based on a hash function according to an embodiment of the present invention.

Referring to FIG. 7, in the large-scale simultaneous digital signature service method based on a hash function according to an embodiment of the present invention, when a plurality of digital signature service provision servers 200-1 to 200-N are interconnected, as shown in FIG. 5, the large-scale digital signature service must be performed by distributed processing, as shown in FIG. 2. Here, FIG. 7 describes the process for interconnecting the digital signature provision servers 200-1 to 200-N, as illustrated in FIG. 5.

At first, each digital signature service provision server 200-1 to 200-N is not connected to any other, and has not been authorized by the digital signature service configuration server 300.

In order for the digital signature service provision servers 200-1 to 200-N to perform the large-scale simultaneous digital signature service method, they must be authorized as digital signature service provision servers for the construction of a hash tree by the digital signature service configuration server 300 and be connected to the previously authorized digital signature service provision server in order to achieve the interconnected state shown in FIG. 5.

At first, in order for each of the digital signature service provision servers 200-1 to 200-N to perform the large-scale simultaneous digital signature service method, it is necessary to be authorized as a digital signature service provision server for the construction of a hash tree by the digital signature service configuration server 300. Here, FIG. 7 illustrates only the process performed by the digital signature service provision server 200-N and the digital signature service configuration server 300.

When there are digital signature service provision servers 200-1 to 200-(N−1) that currently perform a large-scale simultaneous digital signature service method, a digital signature service provision server 200-N, which has not performed the large-scale simultaneous digital signature service method, needs to undertake the following processes in order to perform the method.

First, the digital signature service provision server 200-N requests the digital signature service configuration server 300 to issue a unique authentication token by transmitting unique server authentication information, that is, unique authentication information, to the digital signature service configuration server 300 at step S100.

In this case, if the large-scale simultaneous digital signature service method is performed by the digital signature service provision server 200-N depending on a specific server administrator, the unique authentication information desirably includes at least one of unique identification information of the server administrator, selected from among an ID and password of the server administrator, biometric information of the server administrator, and authentication information generated by a private key based on a One-Time Password (OTP) and Public Key Infrastructure (PKI).

Meanwhile, if the digital signature service provision server 200-N performs the large-scale simultaneous digital signature service method depending on the hardware of a specific server, it is desirable for the unique authentication information to include at least one of unique device identification information, selected from among the name of the device, the password of the device, the serial number of the device, the kind of the device, the manufacturer of the device, the Media Access Control (MAC) address of the device, the unique Internet Protocol (IP) address of the device, the model and version of the device, the secret key of the device, and authentication information of the device, generated by a private key based on a PKI.

Subsequently, the digital signature service configuration server 300 determines whether the digital signature service server 200-N has the right to perform the large-scale simultaneous digital signature service method at step S110 by comparing the unique authentication information, transmitted at step S100, with unique authentication information previously stored in a separate database.

As a result of the determination at step S110, if the digital signature service provision server 200-N has the right to perform the large-scale simultaneous digital signature service method, a unique authentication token for the unique authentication information is generated and encrypted at step S120 as the result of approving the server authentication, and information about digital signature service interworking is generated and encrypted at step S130. Then, the data, generated and encrypted at steps S120 and S130, are transmitted to the digital signature service provision server 200-N at step S140.

Here, it is desirable for the information about digital signature service interworking, generated at step S130, to include the list of the digital signature service provision servers 200-1 to 200-(N−1) to be connected, the position of a hash subtree to be processed by the digital signature service provision server 200-N, information about service rights, and the like.

At step S150, the digital signature service provision server 200-N decrypts the information about digital signature service interworking, transmitted at step S140. Subsequently, depending on the list of the digital signature service provision servers 200-1 to 200-(N−1) to be connected, acquired by the decryption at step S150, the digital signature service provision server 200-N requests the approval of service interworking authorization using the unique authentication token at step S160.

Subsequently, the digital signature service provision servers 200-1 to 200-(N−1) decrypt the unique authentication token, transmitted at step S160, by interworking with the digital signature service configuration server 300 at step S170. When the decryption has been successfully performed, at step S180, the result of approving the digital signature service interworking authorization is transmitted to the corresponding digital signature service provision server 200-N that requested the approval of the digital signature service interworking authorization, whereby the approval of the digital signature service interworking authorization has been completed.

Meanwhile, the unique authentication token is desirably encrypted or decrypted through symmetric cryptography using a symmetric key or asymmetric cryptography using an asymmetric key.

Figure 8:
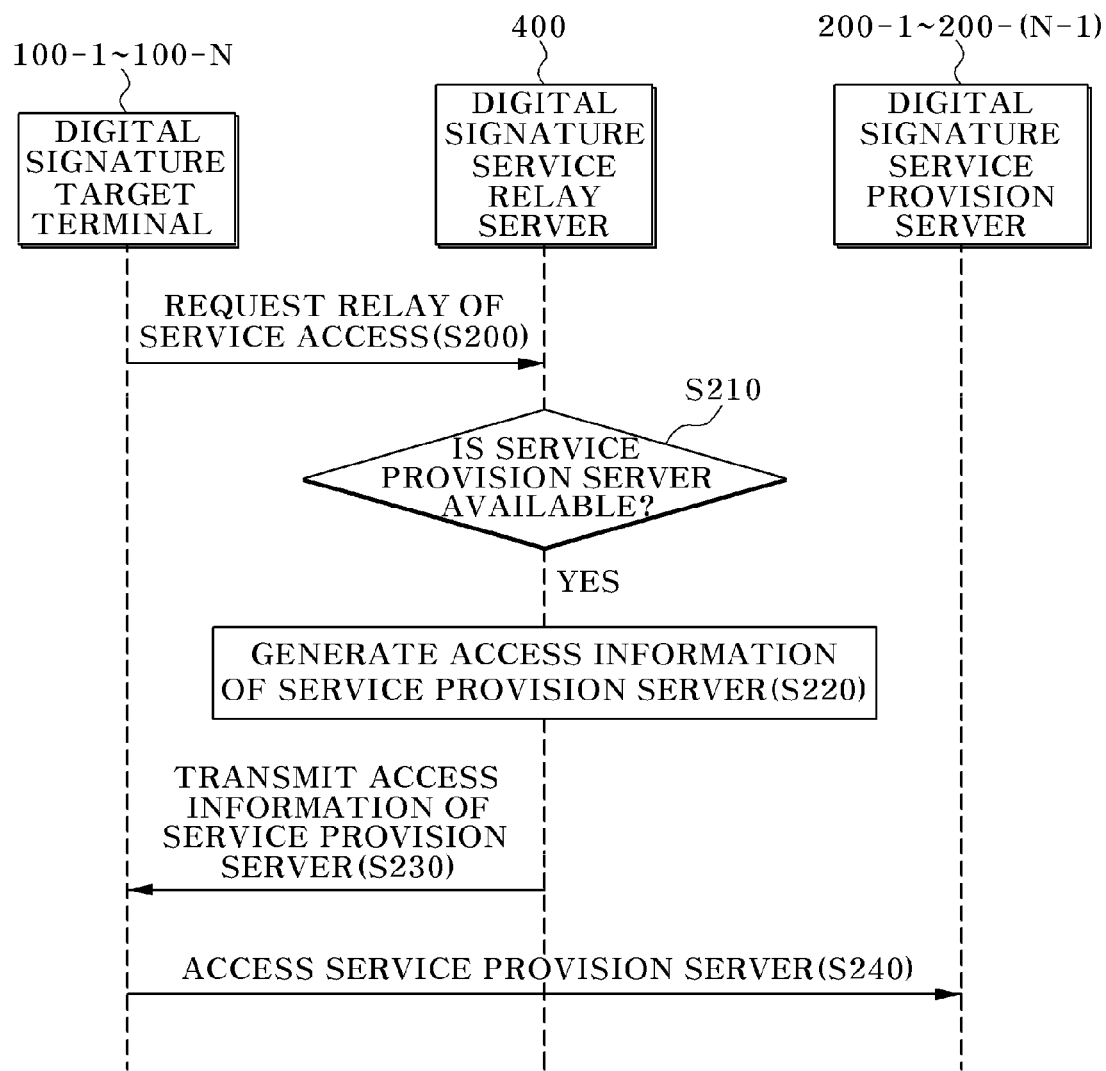
FIG. 8 is a flowchart illustrating a process for relaying the connection of a digital signature target terminal in a large-scale simultaneous digital signature service method based on a hash function according to an embodiment of the present invention.

FIG. 8 is a flowchart illustrating a process for relaying the connection of a digital signature target terminal in a large-scale simultaneous digital signature service method based on a hash function according to an embodiment of the present invention.

Referring to FIG. 8, in the large-scale simultaneous digital signature service method, it is necessary for the digital signature target terminal 100-1 to 100-N to access a specific digital signature service provision server 200-1 to 200-N. In this case, because there are a plurality of digital signature service provision servers 200-1 to 200-N, the digital signature service relay server 400 serves to decide which server is connected.

Specifically, as illustrated in FIG. 8, the digital signature target terminals 100-1 to 100-N transmit a relay request message to the digital signature service relay server 400 in order to access the digital signature service at step S200.

Then, the digital signature service relay server 400 selects one available digital signature service provision server from among the digital signature service provision servers 200-1 to 200-N at step S210, and generates access information about the digital signature service provision server in order to access the corresponding digital signature service provision server 200-1 to 200-N at step S220.

In this case, it is desirable for the access information about the digital signature service provision server to include the unique IP address of the digital signature provision server, the kind of network protocol, the kind of messaging protocol, and the like.

At step S230, the access information about the digital signature service provision server, generated at step S220, is transmitted to the corresponding digital signature target terminal 100-1 to 100-N that requested the relay of the connection. Subsequently, the digital signature target terminal 100-1 to 100-N accesses the digital signature service provision server 200-1 to 200-N using the received access information about the digital signature service provision server at step S240.

Figure 9:
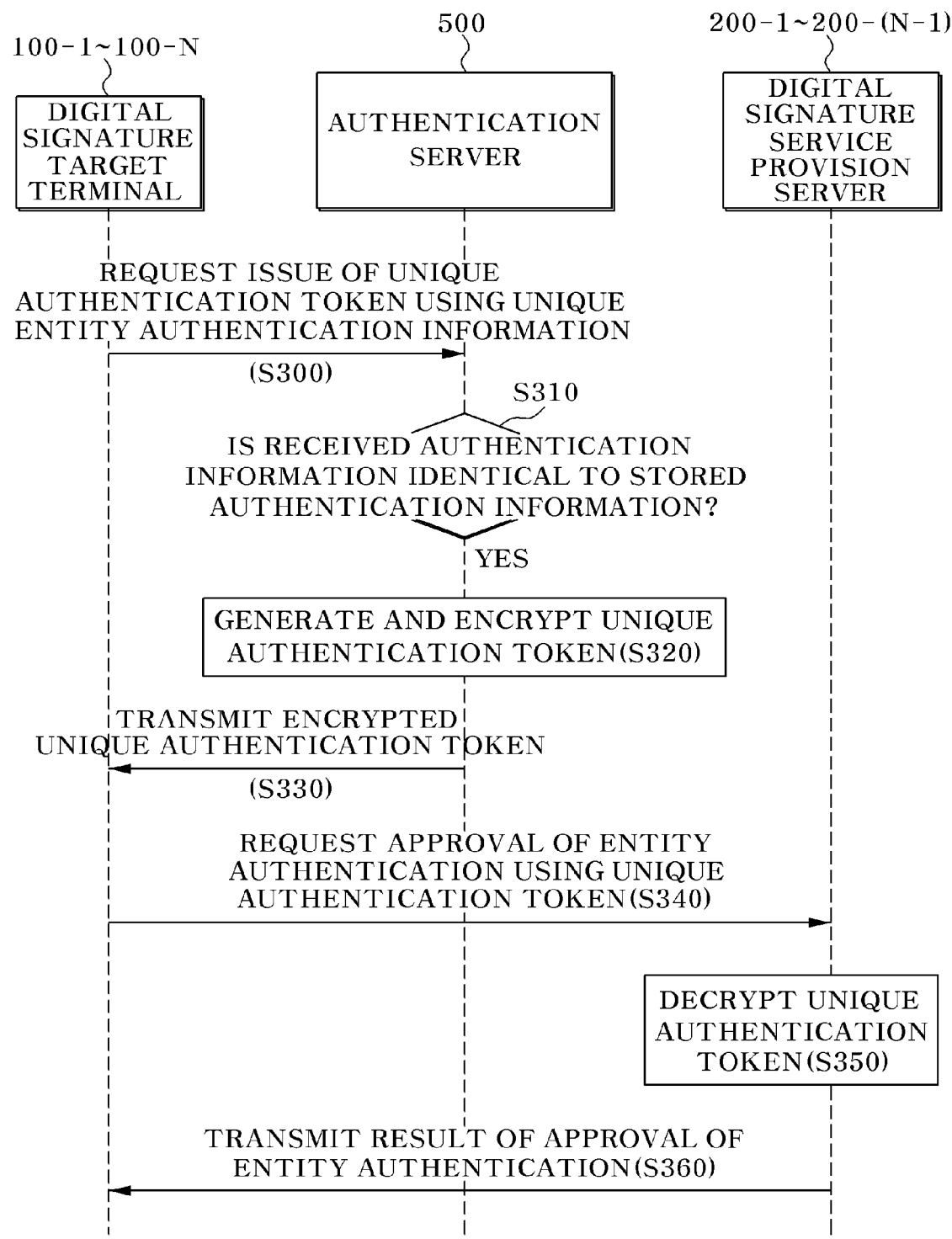
FIG. 9 is a flowchart illustrating a process for approving entity authentication in a large-scale simultaneous digital signature service method based on a hash function according to an embodiment of the present invention.

FIG. 9 is a flowchart illustrating a process for entity authentication in a large-scale simultaneous digital signature service method based on a hash function according to an embodiment of the present invention.

Referring to FIG. 9, the large-scale simultaneous digital signature service method based on a hash function according to an embodiment of the present invention must perform a process for authenticating an entity for which it is intended to acquire a digital signature before receiving the unique digital signature for digital signature target data.

As illustrated in FIG. 9, each of the digital signature target terminals 100-1 to 100-N that intends to acquire a digital signature requests the authentication server 500 to approve the entity authentication by transmitting unique entity authentication information thereto. In other words, each of the digital signature target terminals 100-1 to 100-N requests the issue of a unique authentication token using the unique entity authentication information at step S300.

In this case, if each of the digital signature target terminals 100-1 to 100-N is a user terminal with which a specific user requests a digital signature, it is desirable that the entity authentication information include at least one of unique user identification information, selected from among a membership ID and password of the user, a Social Security number, a phone number, biometric information, a One-Time Password (OTP), a Public Key Infrastructure (PKI), and authentication certificate information.

Meanwhile, if each of the digital signature target terminals 100-1 to 100-N is an electronic device capable of data communication, it is desirable that the entity authentication information include at least one of unique device identification information, selected from among the name of the device, the password of the device, the serial number of the device, the kind of the device, the manufacturer of the device, the Media Access Control (MAC) address of the device, the unique Internet Protocol (IP) address of the device, the model of the device, the secret key of the device, and the authentication information of the device, generated by a private key based on a PKI.

Then, the authentication server 500 determines whether the unique entity authentication information, transmitted at step S300, is identical to unique entity authentication information that has been previously stored in a separate database by comparing them at step S310.

As a result of the determination at step S310, when the unique entity authentication information, transmitted at step S300, is identical to the unique entity authentication information stored in the separate database, a unique authentication token for the unique entity authentication information is generated and encrypted at step S320, as the result of approving the entity authentication. At step S330, the unique authentication token, generated at step S320, is transmitted to the corresponding digital signature target terminal 100-1 to 100-N that requested the approval of the entity authentication.

Subsequently, each of the digital signature target terminals 100-1 to 100-N requests the approval of entity authentication at step 340 by transmitting the unique authentication token, transmitted at step S330, to the digital signature service provision server 200-1 to 200-N.

Subsequently, at step S350, the digital signature service provision server 200-1 to 200-N decrypts the unique authentication token, transmitted at step S340, by interworking with the authentication server 500. When the decryption is successfully performed, at step S360, the result of approval of the entity authentication is transmitted to the corresponding digital signature target terminal 100-1 to 100-N that requested the approval of the entity authentication, whereby the entity authentication approval has been completed.

Meanwhile, the unique authentication token is desirably encrypted or decrypted using a symmetric cryptosystem using a symmetric key or an asymmetric cryptosystem using an asymmetric key.

As described above, when the entity authentication approval process has been completed as the preprocessing process for acquiring a digital signature, a process for generating a digital signature is performed.

Specifically, each of the digital signature target terminals 100-1 to 100-N, for which it is intended to acquire a digital signature, generates a hash value for the digital signature target data using a predetermined hash function, and requests a digital signature by transmitting the hash value of the digital signature target data along with entity identification information to the digital signature service provision server 200-1 to 200-N.

Then, the digital signature service provision server 200-1 to 200-N generates a new hash value by combining the transmitted hash value of the digital signature target data with the transmitted entity identification information, generates a unique digital signature based on the hash chain of a hash tree, constructed using the newly generated hash value by the digital signature service configuration server 300, and transmits the generated unique digital signature to the corresponding digital signature target terminal 100-1 to 100-N.

In this case, the digital signature service provision server 200-1 to 200-N temporarily stores the newly generated hash value in the memory queue and then reads the hash value, temporarily stored in the memory queue, at predetermined time intervals for use in constructing the hash tree. Also, the digital signature service provision server 200-1 to 200-N may compute the value of the root node of the constructed hash tree by interworking with the digital signature service provision server linked to the hash chain of the constructed hash tree, and may generate a unique digital signature using the computed value.

Figure 10:
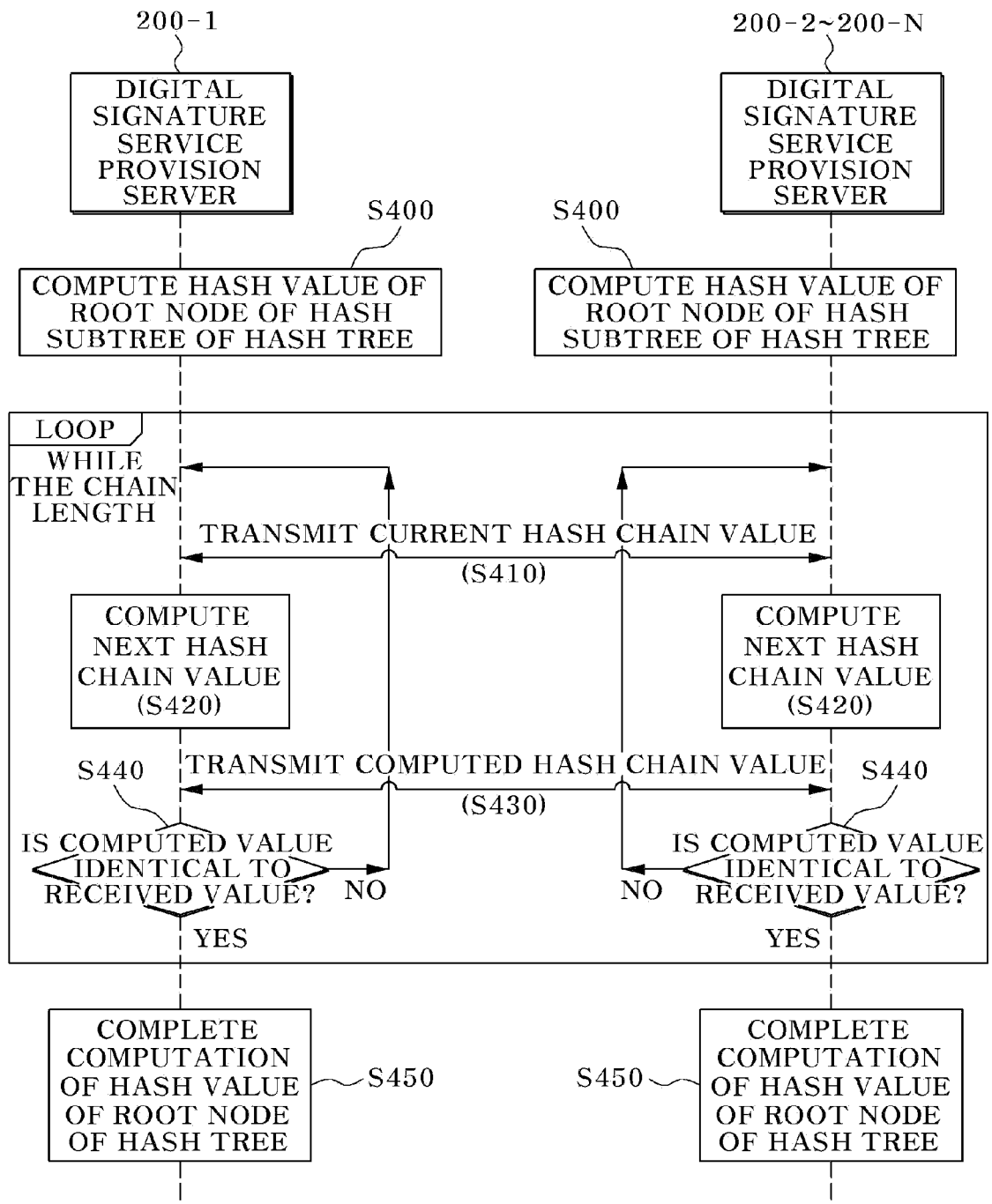
FIG. 10 is a flowchart illustrating a process for synchronizing digital signature service provision servers in a large-scale simultaneous digital signature service method based on a hash function according to an embodiment of the present invention.

FIG. 10 is a flowchart illustrating a process for synchronizing digital signature service provision servers in a large-scale simultaneous digital signature service method based on a hash function according to an embodiment of the present invention.

Referring to FIGS. 1 to 10, a request to generate a digital signature, transmitted from the digital signature target terminal 100-1 to 100-N to the digital signature service provision server 200-1 to 200-N, is generated by the processes described with reference to FIGS. 2 to 4. In this case, the hash value of a node may be shared by the process illustrated in FIG. 10.

The request to generate a digital signature includes the hash value of a digital signature target message for issuing the digital signature.

First, the digital signature service provision server 200-1 to 200-N collects requests to generate digital signatures, received from the digital signature target terminals 100-1 to 100-N, in the queue for a predetermined time interval or until a predetermined number of requests have been collected, and then computes a hash tree having leaf nodes of which the values are the hash value included in the corresponding request to generate the digital signature and an arbitrarily generated random value, at step S400.

In this case, the corresponding hash tree is, for example, the hash tree 617, which is the lower subtree of a single hash tree illustrated in FIG. 2 and FIG. 3. Here, FIG. 3 illustrates the digital signature provision server 200-7, whereas FIG. 10 illustrates the digital signature provision server 200-1.

Subsequently, for the hash chain that starts from the value of the root node of the corresponding hash subtree, the following processes (steps S410 to S440) are repeated as the length of the hash chain.

Specifically, the hash chain value in the previous stage is shared by being transmitted to the digital signature service provision server 200-2 to 200-N, which is the target with which to interwork in this stage, at step S410. In this case, if there is no hash chain value of the previous stage, the value of the root node of the corresponding hash subtree is input. The shared hash chain value is concatenated with another hash chain value in the previous stage, and the hash value of the concatenated value becomes the hash chain value of this stage at step S420.

The hash chain value of this stage is shared by being transmitted to the digital signature service provision server 200-2 to 200-N, which is the target with which to interwork in the next stage, at step S430. Because the digital signature service provision server 200-2 to 200-N, which is the target with which to interwork in this stage, also transmits the hash chain value of this stage to the digital signature service provision server 200-1, the digital signature service provision server 200-1 compares the computed hash chain value with the received hash chain value. As a result of the comparison, if the two values are identical, the next stage is performed, and if not, the process returns to the previous stage at step S440.

When the computation of the hash chain has completed, the acquired value is the result of computing the value of the root node of the single hash tree, whereby the generation of a digital signature is completed at step S450.

Meanwhile, a large-scale simultaneous digital signature service method based on a hash function according to an embodiment of the present invention may be implemented as computer-readable code recorded on a computer-readable storage medium. The computer-readable storage medium includes all kinds of storage media in which data that can be interpreted by a computer system are stored.

For example, the computer-readable storage medium may include ROM, RAM, CD-ROM, a magnetic tape, a hard disk, a floppy disk, a portable storage device, flash memory, optical data storage, and the like.

Also, the computer-readable storage medium may be distributed in a computer system connected by a computer network, and may be stored and executed as code that can be read using a distributed method.

As described above, the large-scale simultaneous digital signature service system based on a hash function and the method thereof according to the present invention have an advantage in that a main agent, which requires the generation of a digital signature, does not itself generate the digital signature, but digital signatures are simultaneously and stably generated for large-scale data, such as multiple electronic documents and digital data, using a hash function and a hash tree, which are known as a simple and secure method, to guarantee the integrity of the data in a digital signature-based structure based on multiple servers.

Also, according to the present invention, it is possible to significantly increase the number of digital signatures that can be generated, and to provide more stable service so as to be able to respond to the failure of a server that provides the digital signature service.

Although a preferred embodiment of the digital signature service system and method according to the present invention has been described for illustrative purposes, those skilled in the art will appreciate that various modifications, additions and substitutions are possible, without departing from the scope and spirit of the invention as disclosed in the accompanying claims.

What is claimed is:

1. A system for a simultaneous digital signature service based on a hash function, comprising:
   a plurality of digital signature target terminals;
   a plurality of digital signature service provision servers for providing a simultaneous digital signature service based on distributed processing of a hash chain of a hash tree in response to a request to generate a digital signature from each of the digital signature target terminals;

a digital signature service configuration server for constructing the hash tree having a hierarchical structure that is preset in order to perform parallel distributed processing for generating a digital signature according to a digital signature service performance right based on unique authentication information provided by each of the digital signature service provision servers; and a digital signature service relay server for enabling access to any one digital signature service provision server, selected from among currently available digital signature service provision servers, in response to a request for accessing the digital signature service from each of the digital signature target terminals, wherein when one of the digital signature service provision servers is newly registered by the digital signature service configuration server, the newly registered digital signature service provision server transmits a message that requests issue of a unique authentication token for digital signature service interworking authorization to the digital signature service configuration server, using unique authentication information;

the digital signature service configuration server compares the unique authentication information, transmitted from the newly registered digital signature service provision server, with previously stored unique authentication information, generates and encrypts both the unique authentication token for the unique authentication information and information about digital signature service interworking if the newly registered digital signature service provision server has the digital signature service performance right, and transmits the encrypted token and the encrypted information to the newly registered digital signature service provision server;

the newly registered digital signature service provision server decrypts the encrypted unique authentication token and the encrypted information about digital signature service interworking, which are transmitted from the digital signature service configuration server, and transmits a message that requests approval of the digital signature service interworking authorization using the unique authentication token according to a list of digital signature service provision servers to be accessed, which is included in the decrypted information about digital signature service interworking; and each of the digital signature service provision servers to be accessed decrypts the unique authentication token, transmitted from the newly registered digital signature service provision server, by interworking with the digital signature service configuration server, and transmits a result of the approval of the digital signature service interworking authorization to the newly registered digital signature service provision server when decrypting is successfully performed, and wherein the information about digital signature service interworking includes a list of the digital signature service provision servers to be accessed, a position of a hash subtree to be processed, and information about a service right;

when the digital signature service provision server performs the simultaneous digital signature service depending on a specific server administrator, the unique authentication information includes at least one of unique identification information of the server administrator, selected from among an ID and password of the server administrator, biometric information of the server administrator, and authentication information generated by a private key based on a One-Time Password (OTP) and a Public key Infrastructure (PKI); and when the digital signature service provision server performs the simultaneous digital signature service depending on specific server hardware, the unique authentication information includes at least one of unique identification information of a device, selected from among a name of the device, a password of the device, a serial number of the device, a kind of the device, a manufacturer of the device, a Media Access Control (MAC) address of the device, a unique Internet Protocol (IP) address of the device, a model and version of the device, a secret key of the device, and authentication information of the device, generated by a private key based on a PKI.

2. The system of claim 1, wherein:

each of the digital signature target terminals transmits a request message for accessing the digital signature service to the digital signature service relay server;

the digital signature service relay server receives the request message for accessing the digital signature service from each of the digital signature target terminals, generates information for accessing any one digital signature service provision server, selected from among the currently available digital signature service provision servers, and transmits the information for accessing the digital signature service provision server to a corresponding digital signature target terminal; and the corresponding digital signature target terminal accesses the corresponding digital signature service provision server using the information for accessing the digital signature service provision server, transmitted from the digital signature service relay server.

3. The system of claim 2, wherein the information for accessing the digital signature service provision server includes at least one of a unique IP address of the digital signature service provision server, a kind of a network protocol, and a kind of a messaging protocol.

4. The system of claim 1, further comprising an authentication server that generates and encrypts a unique authentication token and transmits the unique authentication token to a corresponding digital signature target terminal, when entity authentication information, received from each of the digital signature target terminals, is identical to previously stored entity authentication information, wherein:

each of the digital signature service provision servers decrypts the unique authentication token, transmitted from each of the digital signature target terminals, by interworking with the authentication server, and transmits a result of approval of authentication to a corresponding digital signature target terminal when decrypting is successfully performed;

the corresponding digital signature target terminal transmits a hash value of digital signature target data, which is generated by a predetermined hash function, along with entity identification information to a digital signature service provision server, which is selected by the digital signature service relay server; and the digital signature service provision server, selected by the digital signature service relay server, generates a new hash value by combining the hash value of the digital signature target data with the entity identification information, which are transmitted from the corresponding digital signature target terminal, generates a unique digital signature based on a hash chain of the constructed hash tree, using the generated new hash value, and transmits the unique digital signature to the corresponding digital signature target terminal.

5. The system of claim 4, wherein:
when each of the digital signature target terminals is a user terminal with which a specific user requests a digital signature, the entity authentication information includes at least one of unique identification information of the user, selected from among a membership ID and password of the user, a Social Security number, a phone number, biometric information, a One-Time Password (OTP), a Public Key Infrastructure (PKI), and authentication certificate information; and
when each of the digital signature target terminals is an electronic device capable of data communication, the entity authentication information includes at least one of unique identification information of the device, selected from among a name of the device, a password of the device, a serial number of the device, a kind of the device, a manufacturer of the device, a Media Access Control (MAC) address of the device, a unique Internet Protocol (IP) address of the device, a model and version of the device, a secret key of the device, and authentication information of the device, generated through a private key based on a PKI.

6. The system of claim 4, wherein each of the digital signature service provision servers temporarily stores the generated new hash value in a memory queue, and then reads the new hash value, temporarily stored in the memory queue, at predetermined time intervals, to be used for construction of the hash tree; and
computes a value of a root node of the constructed hash tree by interworking with a digital signature service provision server, linked with the hash chain of the constructed hash tree, and then generates the unique digital signature through the value.

7. A method of performing a simultaneous digital signature service based on a hash function, using a system including a plurality of digital signature target terminals, a plurality of digital signature service provision servers, a digital signature service configuration server and a digital signature service relay server, the method comprising:
(a) constructing, by the digital signature service configuration server, a hash tree having a hierarchical structure that is preset in order to perform parallel distributed processing for generating a digital signature according to a digital signature service performance right based on unique authentication information provided by each of the digital signature service provision servers;
(b) relaying, by the digital signature service relay server, a connection in order to enable access to any one digital signature service provision server, selected from among currently available digital signature service provision servers, in response to a request for accessing a digital signature service from each of the digital signature target terminals; and
(c) providing, by the digital signature service provision server selected in step (b), a simultaneous digital signature service based on distributed processing of a hash chain of the hash tree constructed in step (a) in response to a request to generate a digital signature from each of the digital signature target terminals,
wherein when one of the digital signature service provision servers is newly registered through the digital signature service configuration server, step (a) comprises:

transmitting, by the newly registered digital signature service provision server, a message that requests issue of a unique authentication token for digital signature service interworking authorization to the digital signature service configuration server, using unique authentication information;
by the digital signature service configuration server, comparing the unique authentication information, transmitted from the newly registered digital signature service provision server, with previously stored unique authentication information, generating and encrypting both the unique authentication token for the unique authentication information and information about digital signature service interworking if the newly registered digital signature service provision server has the digital signature service performance right, and transmitting the encrypted token and the encrypted information to the newly registered digital signature service provision server;
by the newly registered digital signature service provision server, decrypting the encrypted unique authentication token and the encrypted information about digital signature service interworking, which are transmitted from the digital signature service configuration server, and transmitting a message that requests approval of the digital signature service interworking authorization using the unique authentication token according to a list of digital signature service provision servers to be accessed, which is included in the decrypted information about digital signature service interworking; and
by each of the digital signature service provision servers to be accessed, decrypting the unique authentication token, transmitted from the newly registered digital signature service provision server, by interworking with the digital signature service configuration server, and transmitting a result of the approval of the digital signature service interworking authorization to the newly registered digital signature service provision server when decrypting is successfully performed, and
wherein the information about digital signature service interworking includes a list of the digital signature service provision servers to be accessed, a position of a hash subtree to be processed, and information about a service right;
when the digital signature service provision server performs the simultaneous digital signature service depending on a specific server administrator, the unique authentication information includes at least one of unique identification information of the server administrator, selected from among an ID and password of the server administrator, biometric information of the server administrator, and authentication information generated by a private key based on a One-Time Password (OTP) and a Public key Infrastructure (PKI); and
when the digital signature service provision server performs the simultaneous digital signature service depending on specific server hardware, the unique authentication information includes at least one of unique identification information of a device, selected from among a name of the device, a password of the device, a serial number of the device, a kind of the device, a manufacturer of the device, a Media Access Control (MAC) address of the device, a unique Internet Protocol (IP) address of the device, a model and version of the device, a secret key of the device, and authentication information of the device, generated by a private key based on a PKI.

8. The method of claim 7, wherein step (b) comprises:
(b-1) transmitting, by each of the digital signature target terminals, a request message for accessing a digital signature service to the digital signature service relay server; and
(b-2) by the digital signature service relay server, receiving the request message for accessing the digital signature service, transmitted at step (b-1), generating information for accessing any one digital signature service provision server, selected from among the currently available digital signature service provision servers, and transmitting the information for accessing the digital signature service provision server to a corresponding digital signature target terminal,
wherein the corresponding digital signature target terminal accesses the corresponding digital signature service provision server using the information for accessing the digital signature service provision server, transmitted in step (b-2).

9. The method of claim 8, wherein in step (b-2), the information for accessing the digital signature service provision server includes at least one of a unique IP address of the digital signature service provision server, a kind of a network protocol, and a kind of a messaging protocol.

10. The method of claim 7, wherein step (c) comprises:
(c-1) requesting, by each of the digital signature target terminals, approval of entity authentication by transmitting entity authentication information to a separate authentication server;
(c-2) by the authentication server, generating and encrypting a unique authentication token and transmitting the unique authentication token to a corresponding digital signature target terminal, when the entity authentication information transmitted at step (c-1) is identical to previously stored entity authentication information;
(c-3) requesting, by each of the digital signature target terminals, approval of entity authentication by transmitting the unique authentication token transmitted in step (c-2) to the digital signature service provision server;
(c-4) by the digital signature service provision server, decrypting the unique authentication token transmitted in step (c-3) by interworking with the authentication server, and transmitting a result of approval of the authentication to a corresponding digital signature target terminal when decrypting is successfully performed;
(c-5) requesting, by the corresponding digital signature target terminal, a digital signature by transmitting a hash value of digital signature target data, which is generated by a predetermined hash function, along with entity identification information to the digital signature service provision server, which is selected by the digital signature service relay server; and
(c-6) by the digital signature service provision server selected by the digital signature service relay server, generating a new hash value by combining the hash value of the digital signature target data with the entity identification information, which are transmitted in step (c-5), generating a unique digital signature based on a hash chain of the constructed hash tree by using the generated new hash value, and transmitting the unique digital signature to the corresponding digital signature target terminal.

11. The method of claim 10, wherein:
when each of the digital signature target terminals is a user terminal with which a specific user requests a digital signature, the entity authentication information includes at least one of unique identification information of the user, selected from among a membership ID and password of the user, a Social Security number, a phone number, biometric information, a One-Time Password (OTP), a Public Key Infrastructure (PKI), and authentication certificate information; and
when each of the digital signature target terminals is an electronic device capable of data communication, the entity authentication information includes at least one of unique identification information of the device, selected from among a name of the device, a password of the device, a serial number of the device, a kind of the device, a manufacturer of the device, a Media Access Control (MAC) address of the device, a unique Internet Protocol (IP) address of the device, a model and version of the device, a secret key of the device, and authentication information of the device generated through a private key based on a PKI.

12. The method of claim 10, wherein, in step (c-6), each of the digital signature service provision servers temporarily stores the generated new hash value in a memory queue, and then reads the generated new hash value, temporarily stored in the memory queue, at predetermined time intervals, to be used for construction of the hash tree; and
computes a value of a root node of the constructed hash tree by interworking with a digital signature service provision server, linked with the hash chain of the constructed hash tree, and then generates the unique digital signature through the value.

13. A computer-readable recording medium in which a program for implementing the method of claim 7 is recorded.

* * * * *